US006108755A

United States Patent [19]

Kabemoto et al.

[11] Patent Number: 6,108,755

[45] **Date of Patent: *Aug. 22, 2000**

[54] ASYNCHRONOUS ACCESS SYSTEM TO A SHARED STORAGE

[75] Inventors: Akira Kabemoto, Yokohama; Toshio Ogawa, Fuchu; Masashi Shirotani, Minami-showa-machi, all of Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 07/856,916

[22] Filed: May 18, 1992

[30] Foreign Application Priority Data

Sep. 18, 1990 [JP] Japan .................................... 2-248205
Sep. 18, 1991 [WO] WIPO ........................ PCT/JP91/01238

[51] Int. Cl.[7] ...................................................... G06F 12/02

[52] U.S. Cl. .......................... 711/147; 711/148; 711/167; 710/260

[58] Field of Search .................................... 395/425, 325, 395/474, 475, 846, 854, 855, 310, 250, 872, 494, 735; 710/260

[56] References Cited

U.S. PATENT DOCUMENTS 4,130,865 12/1978 Heart et al. ............................ 709/201
4,539,637 9/1985 De Bruler ............................... 709/312
4,750,111 6/1988 Crosby, Jr. et al. ...................... 710/58
4,914,654 4/1990 Matsuda et al. ........................ 370/522
4,965,717 10/1990 Cutts, Jr. et al. ......................... 714/12
5,150,467 9/1992 Hayes et al. ............................ 710/107
5,175,825 12/1992 Starr ........................................ 709/213
5,200,564 4/1993 Usami et al. ............................. 84/602
5,237,567 8/1993 Nay et al. ............................... 370/438
5,276,684 1/1994 Pearson et al. ......................... 370/438

FOREIGN PATENT DOCUMENTS 0 364 226 4/1990 European Pat. Off. .
B2-47-25527 7/1972 Japan .
53-135232 11/1978 Japan .
56-156978 12/1981 Japan .
57-25053 2/1982 Japan .
57-211628 12/1982 Japan .
59-116866 7/1984 Japan .
B2-59-41215 10/1984 Japan .
61-165170 7/1986 Japan .
62-52663 3/1987 Japan .
63-126047 5/1988 Japan .
84 01043 3/1984 WIPO .

*Primary Examiner*—Reginald G. Bragdon
*Attorney, Agent, or Firm*—Staas & Halsey

[57] ABSTRACT

The present invention relates to an asynchronous access system for accessing a shared storage in a multiprocessor system in which a plurality of processor modules and shared storage modules are connected through a system bus. The present invention accesses the shared storage at a high speed and reduces the overhead of the system bus. The present invention recognizes in write and read instructions serial access addresses of the shared storage, requests a block access in which a predetermined number of words are grouped as one block, and performs a recovery process when a write instruction is executed abnormally in the block access.

5 Claims, 27 Drawing Sheets

FIG. 12

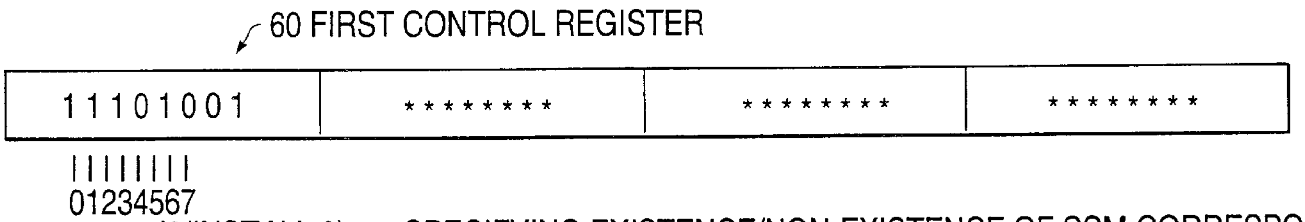

I0(INSTALL 0) ···· SPECIFYING EXISTENCE/NON-EXISTENCE OF SSM CORRESPONDING PARTIAL SSU SPACE #0
I1(INSTALL 1) ···· SPECIFYING EXISTENCE/NON-EXISTENCE OF SSM CORRESPONDING PARTIAL SSU SPACE #1
I2(INSTALL 2) ···· SPECIFYING EXISTENCE/NON-EXISTENCE OF SSM CORRESPONDING PARTIAL SSU SPACE #2
⋮
I7(INSTALL 7) ···· SPECIFYING EXISTENCE/NON-EXISTENCE OF SSM CORRESPONDING PARTIAL SSU SPACE #7

I0～I7 0 ···· SPECIFYING NON-EXISTENCE OF SSM CORRESPONDING TO EACH PHYSICAL ADDRESS
1 SPECIFYING EXISTENCE OF SSM CORRESPONDING TO EACH PHYSICAL ADDRESS

FIG. 13

62-1 SECOND CONTROL REGISTER

| | | | | | | | |
|---|---|---|---|---|---|---|---|
| 0 | 0000000 | 0 | 0000001 | 1 | 0000010 | * | ******* |
| D0 | UIDO | D1 | UID1 | D2 | UID2 | D3 | UID3 |

62-1

| | | | | | | | |
|---|---|---|---|---|---|---|---|
| 1 | 0000101 | * | ******* | * | ******* | 0 | 0000111 |
| D4 | UIDO | D5 | UID1 | D6 | UID2 | D7 | UID3 |

D0 ····· SPECIFYING CONFIGURATION ACCESS MODE OF SSM CORRESPONDING TO PARTIAL SSU SPACE #0
D1 ····· SPECIFYING CONFIGURATION ACCESS MODE OF SSM CORRESPONDING TO PARTIAL SSU SPACE #1
D2 ····· SPECIFYING CONFIGURATION ACCESS MODE OF SSM CORRESPONDING TO PARTIAL SSU SPACE #2
⋮
D7 ····· SPECIFYING CONFIGURATION ACCESS MODE OF SSM CORRESPONDING TO PARTIAL SSU SPACE #7
UID0 ~ 7 ····· SPECIFYING UNIT -ID IN SSBUS OF SSM CORRESPONDING TO EACH PARTIAL SSU SPACE.
DUPLEX CONFIGURATION OF SSU IS FIXED WITH THE LOWEST ORDER UID BIT OF '0' OR '1'

EXAMPLE OF DESCRIPTOR

ACEXC : ACCESS EXCEPTION
NEW·ACCS : NEW ACCESS
CAN·ACPT : CANCEL ACCEPT
WT·ACPT : WRITE ACCEPT
WT·CPT : WRITE COMPLETE

A : AVAILABLE
B : BUSY
EP : EXCEPTION PENDING
RP : RETRY PENDING

ASYNCHRONOUS ACCESS SYSTEM TO A SHARED STORAGE

FIELD OF THE INVENTION

The present invention relates to an asynchronous access system for accessing a shared storage of a multiprocessor system in which processor modules and shared storage modules are connected together by a system bus.

BACKGROUND OF THE INVENTION

Since a processor in a multiprocessor system directly accesses a shared storage according to its physical address, data is transmitted in word units through a system bus synchronously with an access instruction. When a number of processors are provided in the system, the frequency of accesses via the system bus rises. Therefore, the number of processors in the system is limited, and therefore limits the system performance. Accordingly, a shared storage must be accessed at a high speed, and the overhead of the system bus must be reduced by minimizing its load.

A conventional multiprocessor system comprises a plurality of processor modules and a plurality of shared storage modules which are connected together by a system bus for transfer of information, thereby forming a computer system.

In such a conventional multiprocessor system, a central processing unit of each processor module is operated in a synchronous access method in which a shared storage module at its physical address space is directly accessed through a system bus according to a physical address.

SUMMARY OF THE PRESENT INVENTION

However, there is a problem in that it takes a much longer time for a processor module to access a shared storage through a system bus using a synchronous access method than to access a main storage in the processor module.

The present invention has been developed to solve the problem above. An object of the present invention is to provide an asynchronous access system for accessing a shared storage in which a shared storage is accessed at a high speed and its load is minimized by reducing the overhead of the system bus.

More specifically, the object of the present invention is to provide an asynchronous access system for accessing a shared storage at a high speed by using as a cache memory a connection unit of a processor module to a system bus.

In a normal program mode (synchronous access), four words (command, address, data, status (C, A, D, S)) are necessary for one access through a bus. If sixteen words for four accesses in the program mode are accessed as one block in the DMA format, the necessary number of words is only seven, that is, a command, an address, four pieces of data, and a status (C, A, D, D, D, D, and S). This is half the number of words used in the program mode. Thus, an asynchronous access system for accessing a shared storage can be realized with a reduced overhead and efficient performance of a system bus.

FIGS. 1A and 1B show the principle of the present invention.

As shown in FIG. 1A, the present invention comprises a plurality of processing modules (processor modules) 10 each comprising at least a main storage 20, a central processing unit 18, and a connection unit 22 for connection to a system bus 16, and a plurality of shared storage modules 12 each comprising at least a shared storage unit 26 and a connection unit 28 for connection to a system bus 16.

As an asynchronous access system for accessing a shared storage based on the above described configuration of a computer system, the present invention requests a block access to the shared storage module 12 through the system bus 16 when the connection unit 22 of the processing module 10 recognizes serial addresses of write instructions or read instructions issued by the central processing unit 18 to the shared storage module 12 as shown in FIG. 1B.

In response to a block read request of the processing module 10, the connection unit 28 of the shared storage module 12 reads from the shared storage unit 26 one-block of data comprising a predetermined number of words preceded by an access address, and transmits them to the processing module 10.

When the answer from the shared storage module 12 in response to the block read request is received by the connection unit 22 of the processing module 10, the one-block data comprising a predetermined number of words is stored in an internal buffer of the connection unit 22. Then, in response to the next read instruction of the central processing unit 18, corresponding data stored in the internal buffer is read for transmission.

When the connection unit 22 of the processing module 10 receives serial addresses of write instructions from the central processing unit 18, the write data from the central processing unit 18 is stored in the internal buffer. Then, a block write request is issued to the shared storage module 12 when the buffer is full, that is, when the stored data has reached one-block volume comprising a predetermined number of words.

Additionally, in the asynchronous access system for accessing a shared storage in the present invention, the connection unit 22 of the processing module 10 generates a start transfer command (SC) comprising a destination ID code (DID) indicating a shared storage module 12 to be accessed, a source ID code (SID) indicating the source of the transmitted data, an operand indicating an access mode, and an access data capacity (BCT). Then, it transmits the activation transfer command (SC) to the above described system bus 16 together with an access address (A) in the shared storage module 12 at the destination.

That is, the connection unit 22 transmits an activation transfer command (SC) and an access address (A) at the time of a reading access, and transmits a start transfer command (SC), an access address (A), and write data at the time of a writing access.

The connection unit 28 of the shared storage module 12 monitors the access bus 16, and accepts the start transfer command (SC) when it determines that the destination ID code of the start transfer command (SC) and its own unit ID match.

Then, the connection unit 28 of the shared storage module 12 generates a response transfer, command (EC) comprising an ID code (DID) indicating, the processing module 10 at the destination, a source ID code (SID) indicating the source of the data, and a terminating code and transmits the command to the system bus 16 when the access of the shared storage unit 26 is terminated according to the start transfer command (SC) received during the receiving operation.

In response to the answer, the connection unit 22 of the processing modules 10 monitors the system bus 16, and accepts the response transfer command (EC) when it determines that the destination ID code (DID) of the response transfer command (EC) and its own unit ID match.

According to the asynchronous access system with the above described configuration of the shared storage of the present invention, data is transmitted in block units, which have a predetermined number of words, through a system bus for one access instruction, corresponding to access instructions having serial access addresses for synchronous access. Sending data in block units can speed up accessing data through a system bus and reduce an overhead of a system bus, thereby reducing its load, improving its efficiency, and enhancing the system performance.

BRIEF DESCRIPTION OF THE DRAWINGS

FIG. 12 is a diagram for explaining SSM configuration definitions by the first control register according to the present invention;

FIG. 13 is a diagram for explaining SSM configuration definitions by the second control register according to the present invention;

FIG. 22C shows the process performed by the interrupt handler for interrupting the serialize instruction.

DESCRIPTION OF THE PREFERRED EMBODIMENTS

Figure 1A:
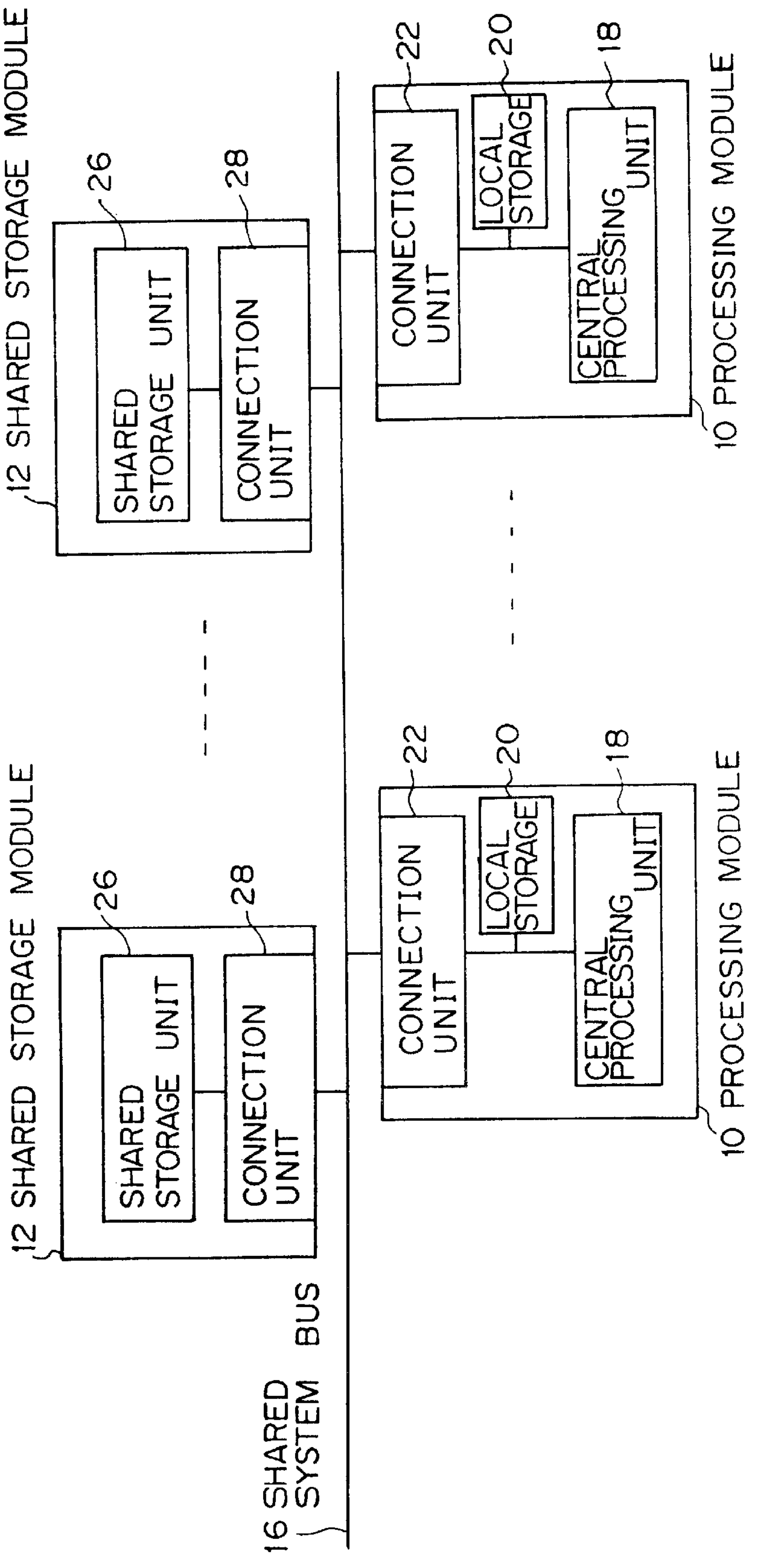
FIGS. 1A and 1B are diagrams for explaining the fundamentals of the present invention.
Figure 1B:
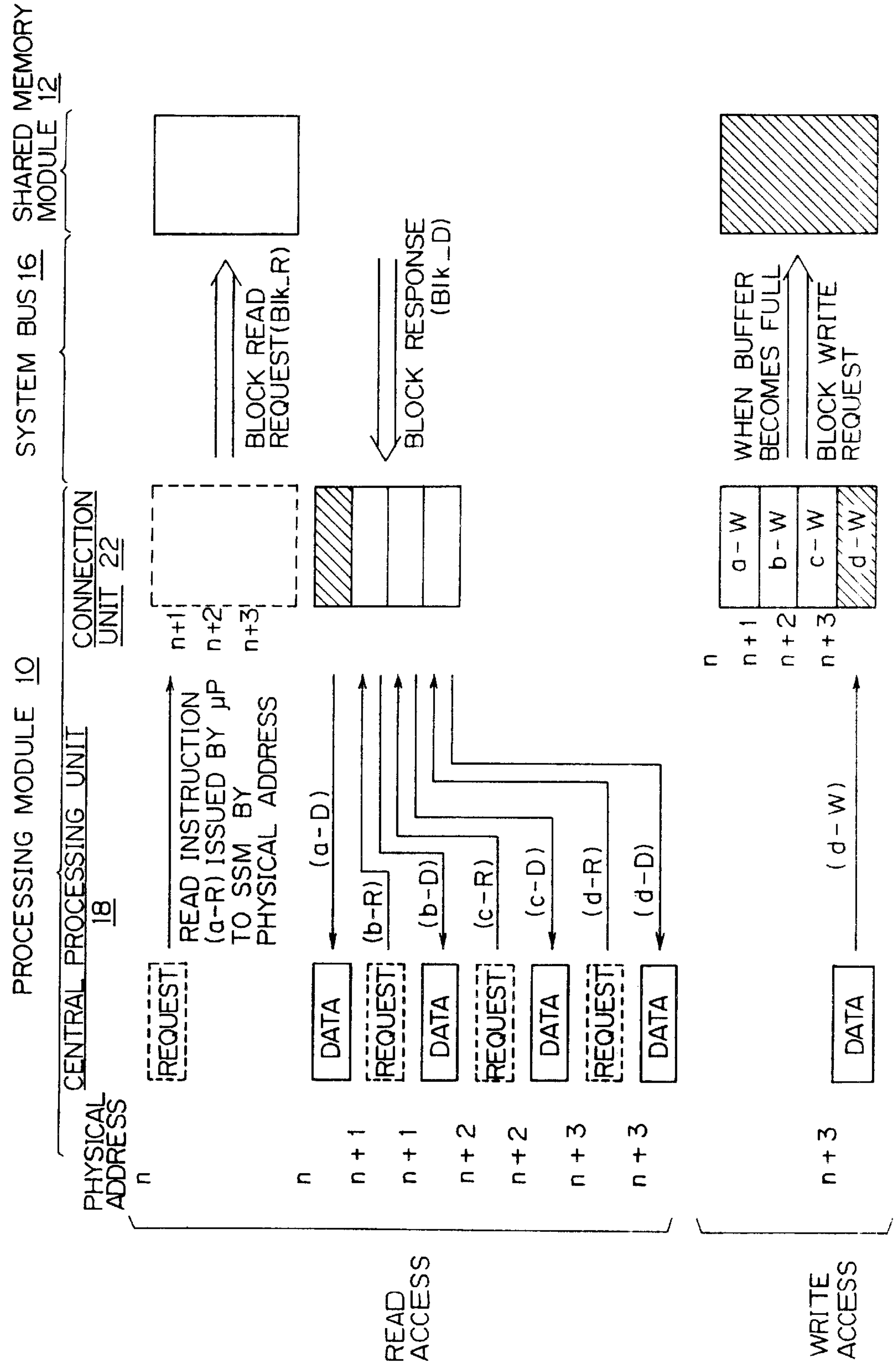
Figure 2:
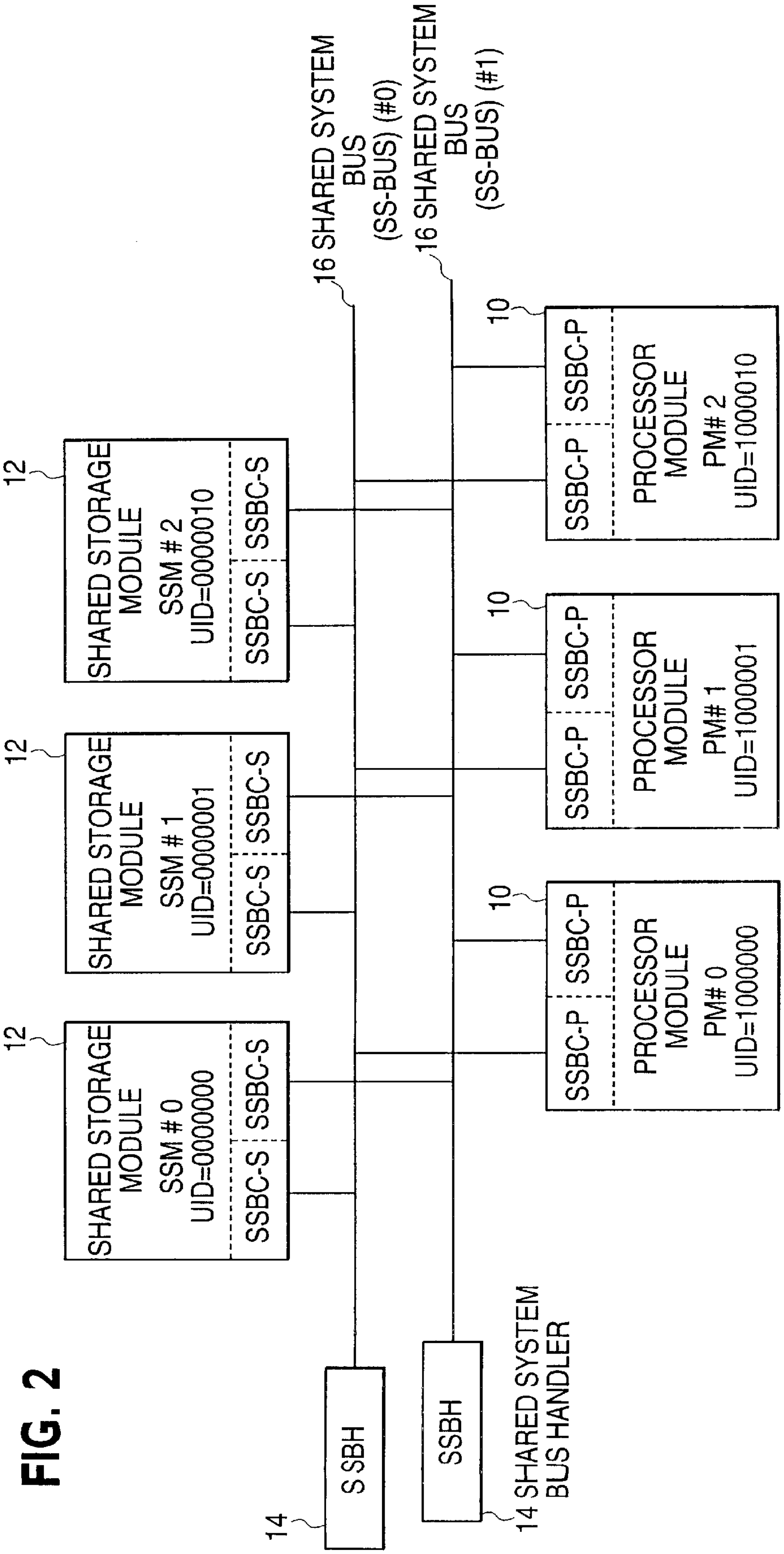
FIG. 2 illustrates a multiprocessor system configuration of the present invention.

FIG. 2 illustrates a system configuration of a multiprocessor system to which a shared storage configuration system according to the present invention is applied.

The multiprocessor system comprises more than one processor module (PM) 10 and more than one shared storage module (SSM) 12. The processor modules 10 and the shared storage modules 12 are each connected to a shared system bus (SS-BUS) 16, a split bus, through a connection unit (SSBC-P) 22. The shared system bus 16 is controlled by a shared system bus handler (SSBH) 14 and the arbitration of the shared system bus 16 is centrally controlled by the shared system bus handler 14.

The #0 to #2 processor modules 10 have their unit ID numbers allocated as follows:

PM#0; UID=1000000

PM#1; UID=1000001

PM#2; UID=1000010

Also, the #0 to #2 shared storage modules 12 have their ID numbers allocated as follows:

SSM#0; UID=0000000

SSM#1; UID=0000001

SSM#2; UID=0000010

Although the process modules 10 and the shared storage modules 12 are each controlled by the #0 and #1 shared system bus 16 which is duplicated for fault-tolerant purposes, they may be connected to more shared system buses 16.

Figure 3:
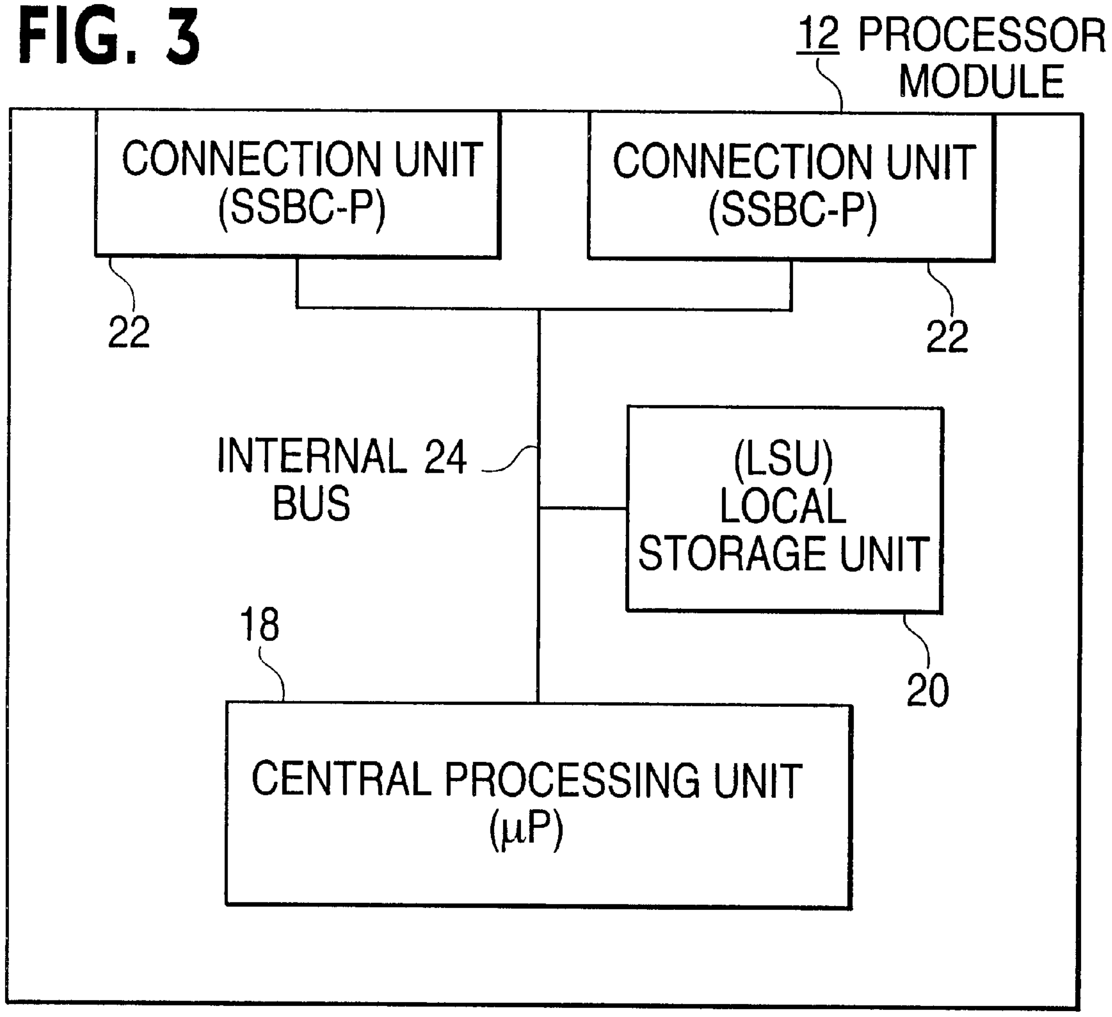
FIG. 3 is a block diagram of a processor module of the present invention.

FIG. 3 is a block diagram of the processor module shown in FIG. 2.

The processor module comprises a central processing unit ($\mu$P) 18, a local storage unit (LSU) 20 and two connection units (SSBC-P) 22 for the two shared system buses 16, which are all connected by an internal bus 24.

In the processor module 10, software (OS) runs on the central processing unit 18 and the local storage unit 20. Pieces of software from the processor modules 10 shown in FIG. 2 cooperate with one another to form a distributed OS for performing a set of operations. The central processing unit 18 of each processor module 10 fetches instruction codes only from its local storage unit 20.

Figure 4:
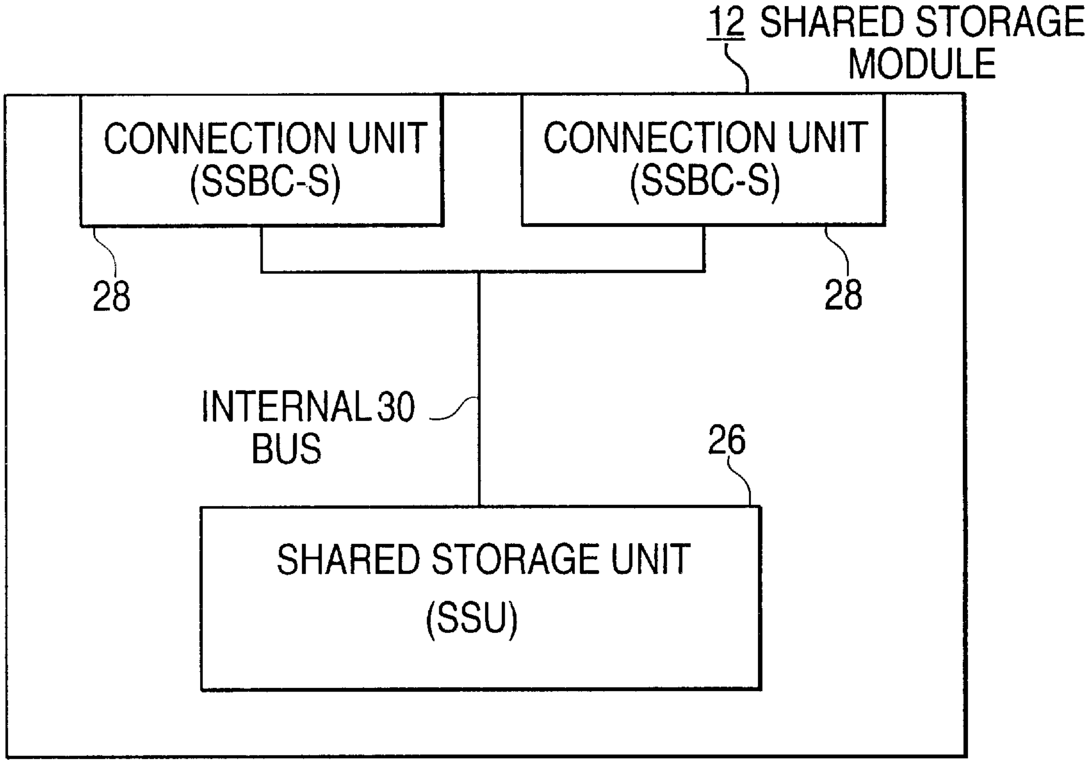
FIG. 4 is a block diagram of a shared storage module of the present invention.

FIG. 4 is a block diagram of the shared storage module 12 shown in FIG. 2.

The shared storage module 12 comprises a shared storage unit (SSU) 24 and two connection units (SSBC-S) 28 corresponding to the two shared system buses 16, which are all connected by an internal bus 30. The shared storage unit 26 stores data to be shared among the processor modules 10 shown in FIG. 2.

Figure 5:
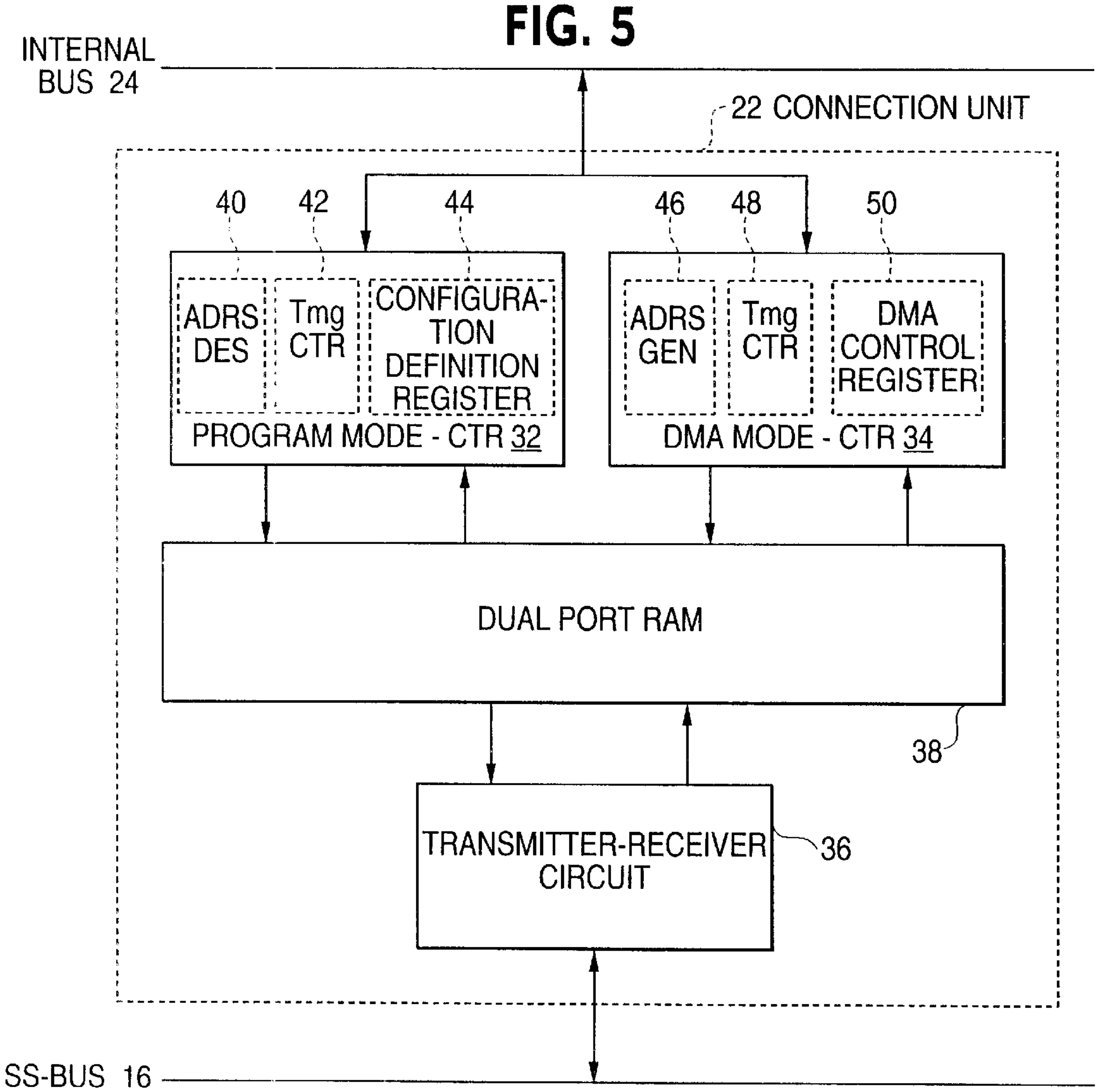
FIG. 5 is a block diagram of a connection unit of the present invention, which is included in the processor module.

FIG. 5 is a block diagram of the connection unit (SSBC-P) 22 in the processor module 10 of FIG. 3.

The connection unit 22 accesses the shared, storage unit 12 of FIG. 2 via the shared system bus 16 in the following two modes:

(1) program mode (2) DMA mode

The program mode can be operated in the synchronous access method in which transmission data contain one word for one access instruction, and in the asynchronous access method in which data is transmitted in block units each containing a plurality of words for one access instruction.

The connection unit 22 comprises a program mode access control circuit 32 and a DMA mode access control circuit 34, which are provided for the two access modes. It further comprises a transmitter-receiver circuit 36 for transmitting data to or receiving data from the shared system bus 16 and a dual port RAM 38, which serves as a buffer. The program mode control circuit 32 comprises an address decoder 40, a timing controller 42, and a configuration definition register 44. The DMA mode access control circuit 34 comprises an address generator 46, a timing controller 48 and a DMA control register 50.

Figure 6:
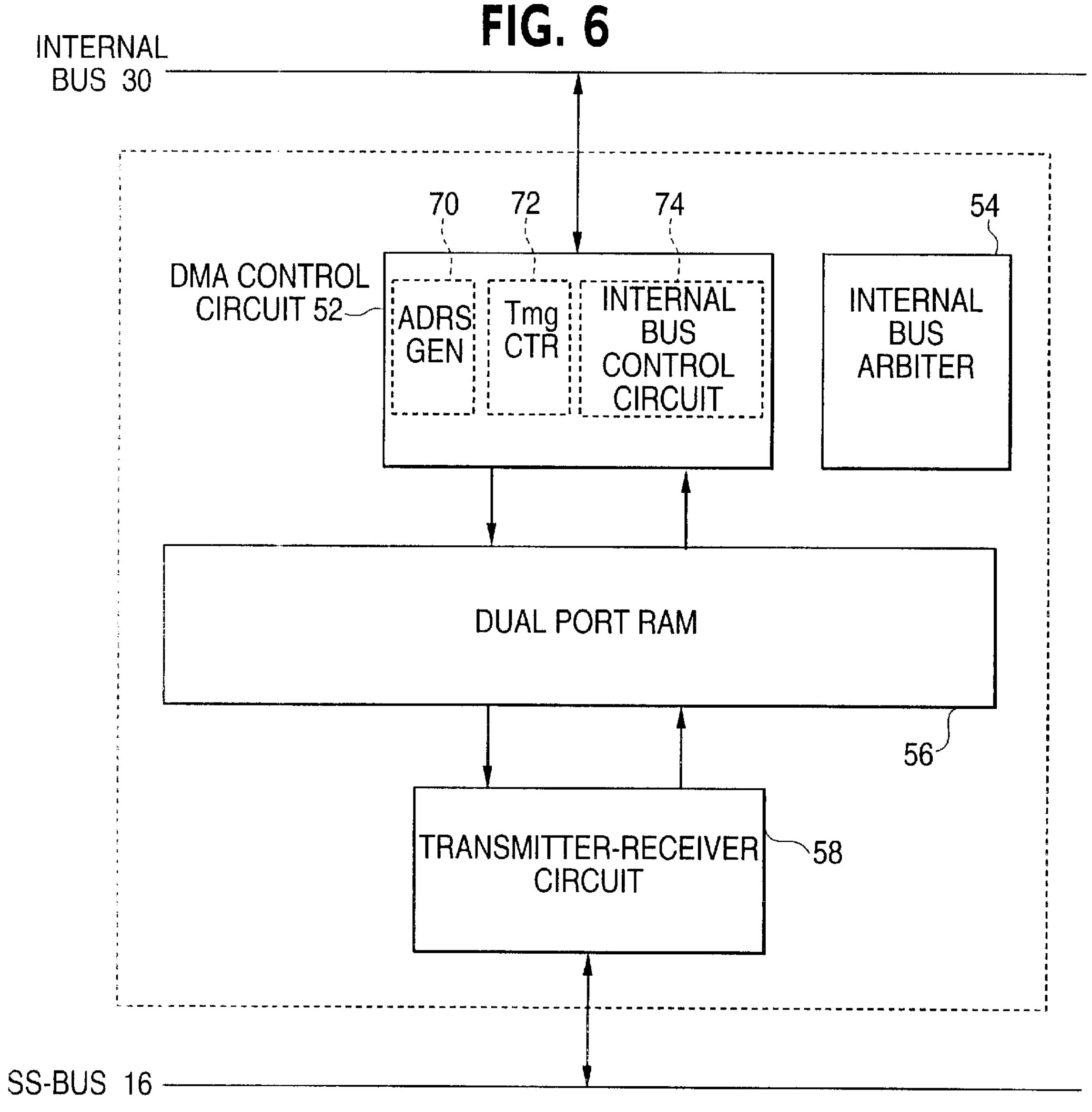
FIG. 6 is a block diagram of a connection unit of the present invention, which is included in the shared storage module.

FIG. 6 is a block diagram of the connection unit (SSBC-S) 28 of the shared storage module 12 shown in FIG. 4.

The connection unit 28 is constructed from a DMA control circuit 52 an internal bus arbiter circuit 54, a transmitter-receiver circuit 56, and a dual port RAM 58. The DMA control circuit comprises an internal bus control circuit 74 for controlling the internal bus 30, an address generator 70 and a timing controller 72. The internal bus arbitrator circuit 54 performs the arbitration of the internal bus 30 when more than one connection unit 28 is installed in the shared storage module 12, as shown in FIG. 4. The transmitter-receiver 56 is for the shared system bus 16. the dual port RAM 58 serves as a buffer.

The connection units 22 and 28, which make connections among the processor modules 10 and the shared storage modules 12 via the shared system bus 16, adopt a split transfer system in which each access is split into a start transfer and a response transfer.

In the bus control of the split transfer system, a unit ID number is allocated to each module, the unit ID being used as a module identifier on the bus.

Figure 7:
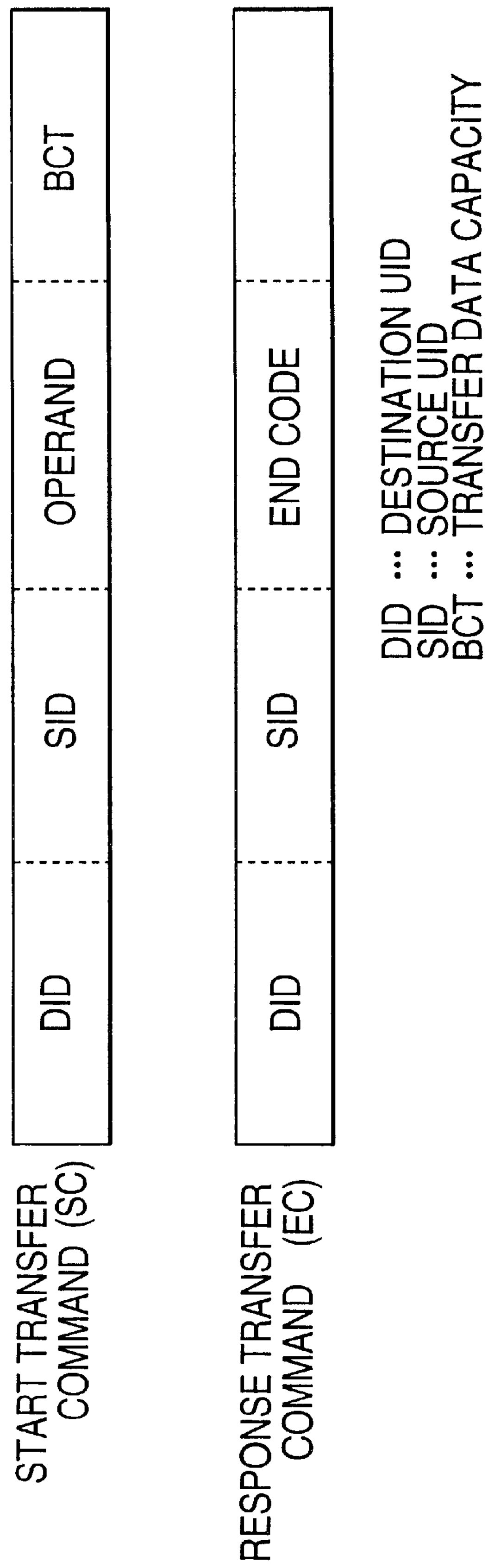
FIG. 7 is a diagram for explaining transfer commands on the system bus according to the present invention.

FIG. 7 illustrates examples of a start transfer command SC and a response transfer command EC used by the connection units 22 and 28.

In the start transfer command SC of FIG. 7, the DID (Destination ID) indicates the unit ID of a destination module and the SID (Source ID) indicates the unit ID of a source module. The operand indicates a type of access. The types of access include memory access to the shared storage modules 12, control register access to the shared storage modules 12 and the other processor modules 10 to halt or reset them and so on. The BCT (Byte Count) indicates data capacity in accessing the shared storage modules 12.

In the response transfer command EC, the DID and SID are the same as those in the start transfer command SC and the end code indicates a conclusion state of the destination, i.e., normal, conclusion or abnormal conclusion.

Figure 8:
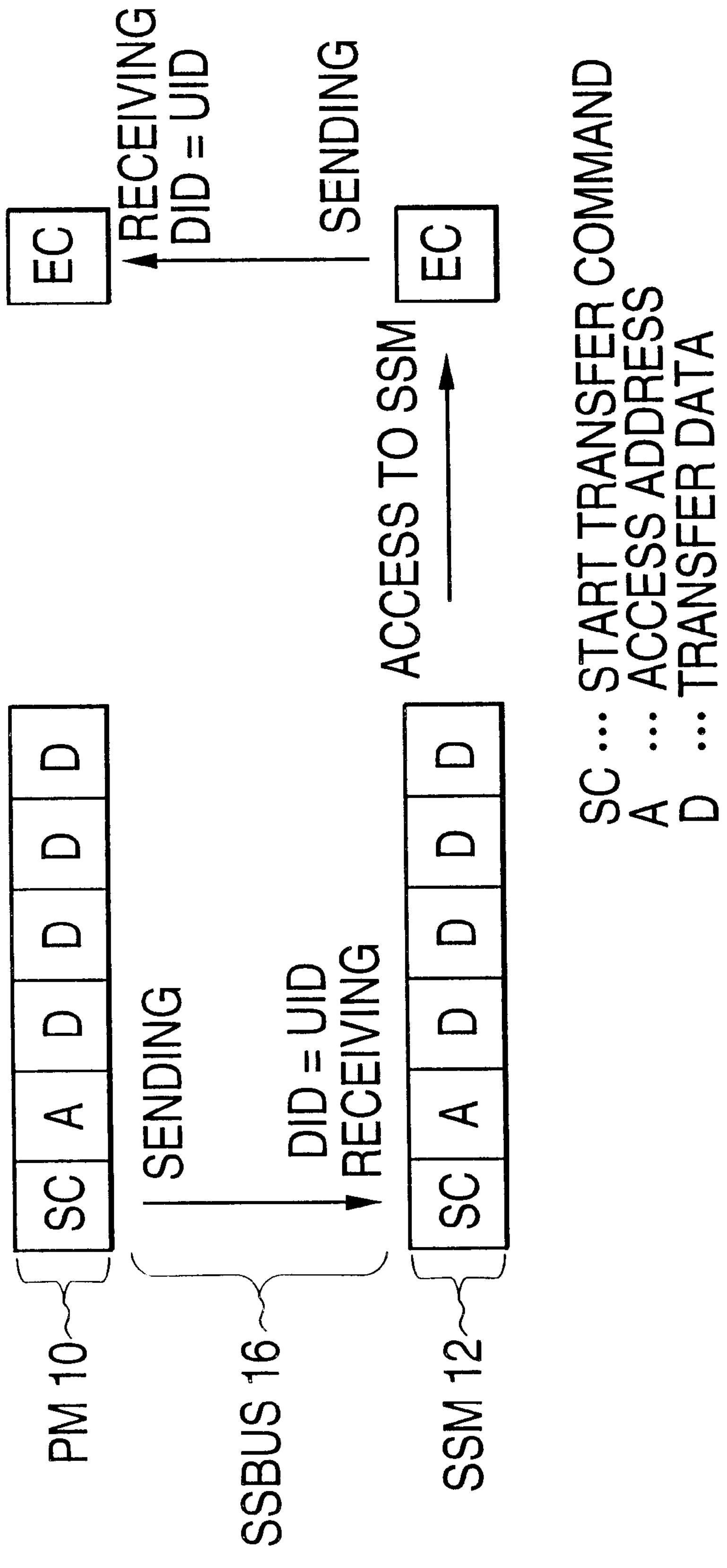
FIG. 8 is a diagram for explaining writing and transfer operations according to the present invention.

FIG. 8 is a diagram for explaining the operation of write access (store access) for transferring data from a source processor module 10 to a shared storage module 12 over the shared system bus 16 and writing it in the shared storage 12.

First, the source (accessing) processor module 10 generates a start transfer command SC. That is, the transfer start command SC generated by the source processor module consists of the SID indicating its own unit ID, the DID indicating the unit ID of a shared storage module 12 being accessed, an operand indicating the write access and the BCT indicating the access capacity. Following the transfer start command SC, an access address A of the destination shared storage module 12 and data D to be written into are sent onto the system bus 16.

The destination shared storage module 12 monitors the shared system bus 16 and compares the DID indicating the destination contained in the start transfer command SC with its own unit ID. When a coincidence occurs, the shared storage module 12 performs an accepting operation. The shared storage module 12 then makes a write access to the shared storage unit 26 (refer to FIG. 4) and transmits to the source processor module 10 a response transfer command EC including the end code of the write access and in which the DID and SID are interchanged because the start transfer and the response transfer are opposite to each other in the direction of transfer.

The source processor module 10 monitors the shared system bus 16 and performs the accepting operation when a coincidence occurs between the destination ID in the response transfer command EC and its own unit ID, thereby terminating one-time access.

During the idle time from the termination of transmission of the start transfer command SC to the initiation of the transmission of the response transfer command EC, the system bus 16 may be used to transfer the start transfer command SC or the response transfer command EC for another access.

Figure 9:
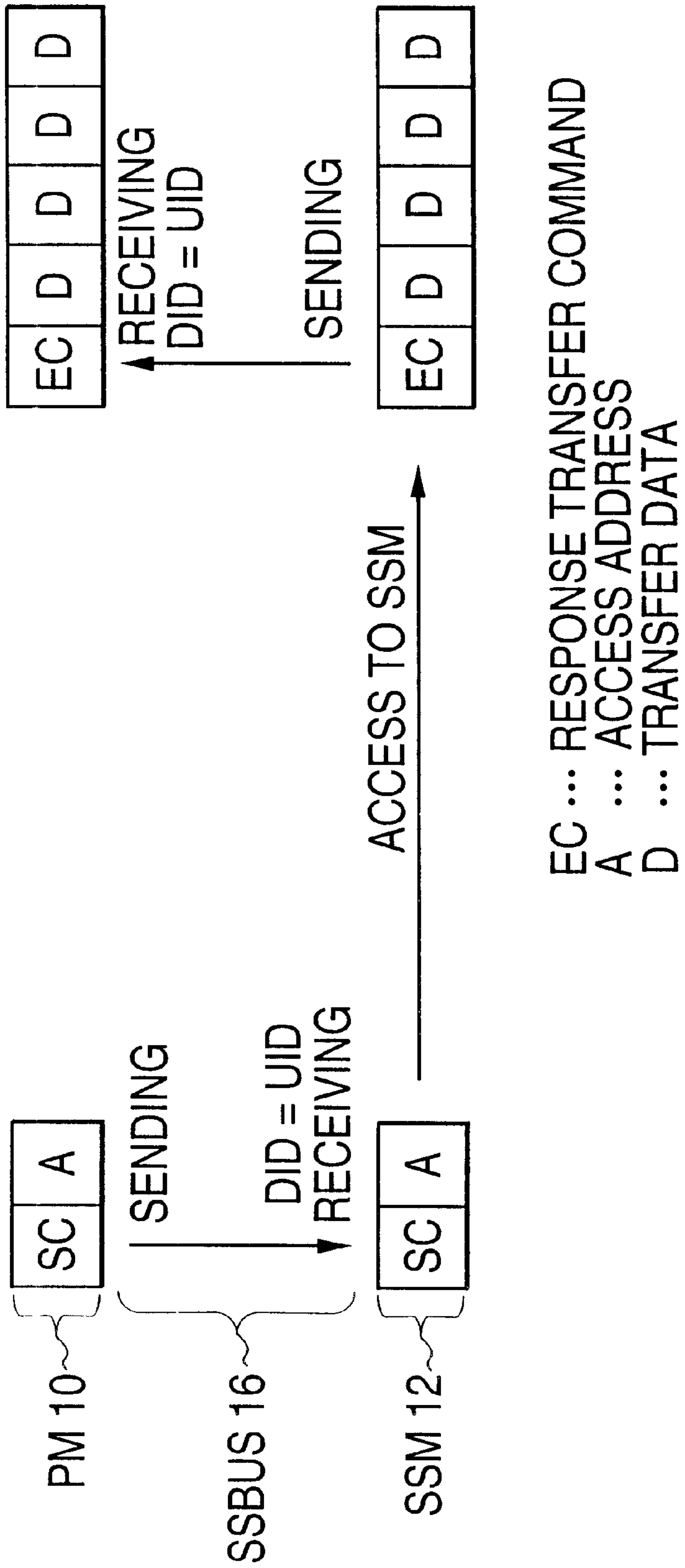
FIG. 9 is a diagram for explaining reading and transfer operations according to the present invention.

FIG. 9 is a diagram for use explaining the operation of read access (fetch access) for reading data from a shared storage module 12 and transferring it to a processor module 10.

First, a source processor module 10 generates a start transfer command SC which consists of the SID indicating its own unit ID, the DID indicating the unit ID of a destination shared storage module 12 being accessed, an operand indicating the read access and the BCT indicating the access capacity. Following the transfer start command SC, an access address A of the shared storage module 12 being accessed is sent onto the system bus 16.

The destination shared storage module 12 monitors the shared system bus 16 and compares the DID in the start transfer command SC with its own unit ID. When the comparison indicates equality, the module 12 performs the accepting operation. The destination shared storage module 12 then makes read access to the shared storage unit 26 (refer to FIG. 4) of the shared storage module 12 and transmits to the source processor module 10 a response transfer command EC, which contains the end code of the read access, and readout data D. In the response transfer command EC, the DID and SID are interchanged because the start transfer and the response transfer are opposite to each other in the direction of transfer.

The source processor module 10 monitors the shared system bus 16 and performs the accepting operation when a coincidence occurs between the destination ID in the response transfer command EC and in its own unit ID, thereby terminating one-time read access.

The read access is made in the program access mode or the DMA access mode. In either access mode, the operations on the system bus 16 are the same.

Figure 10:
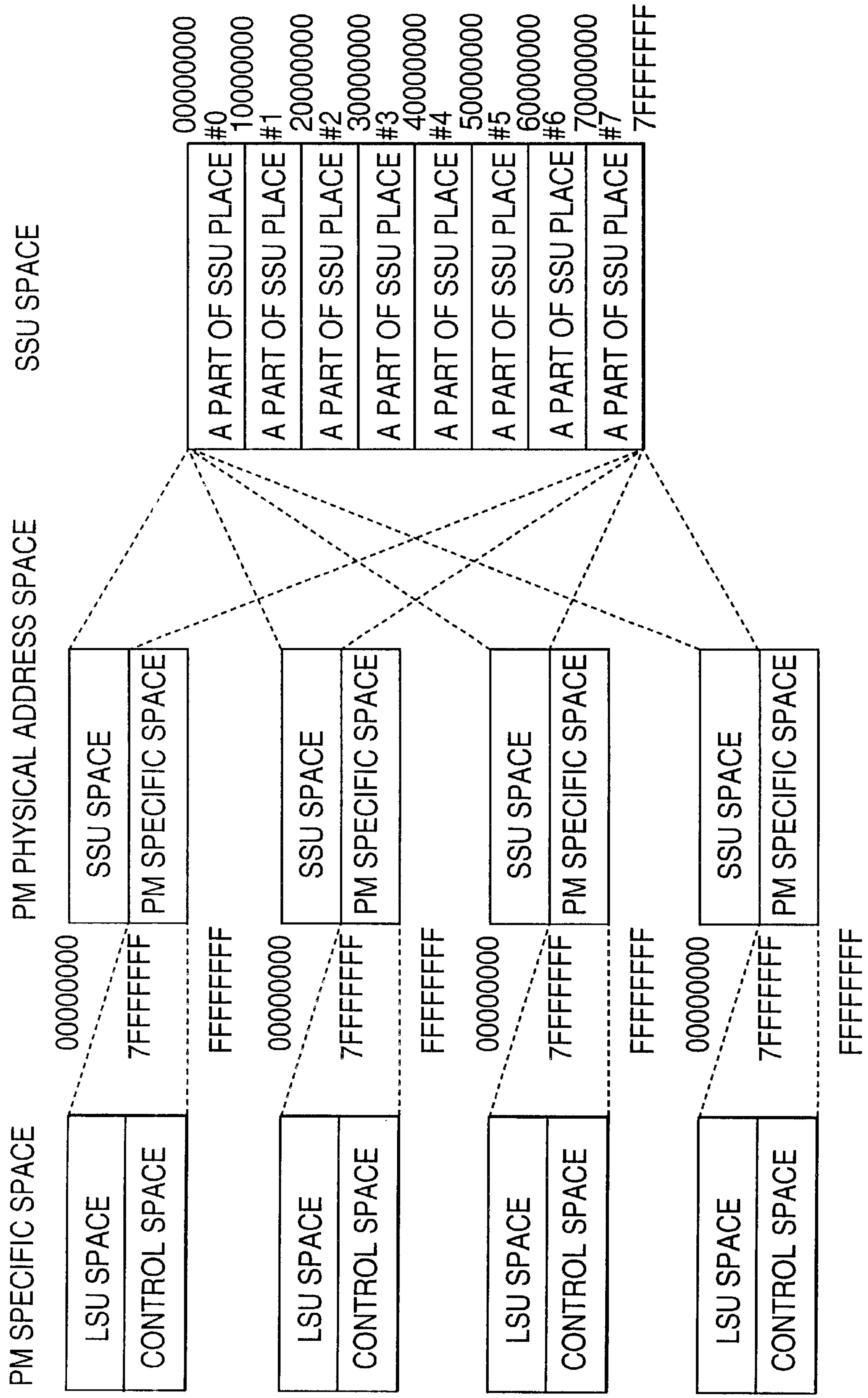
FIG. 10 is a diagram for explaining an address space map according to the present invention.

FIG. 10 is a diagram for explaining an address space map in the present embodiment of the present invention.

In FIG. 10, the physical address space of each processor module is roughly classified into shared storage module space (hereinafter referred to as SSU space) and space inherent in the processor module (hereinafter referred to as PM inherent space).

The PM inherent space is space which is inherent in hardware resources of each processor module 10 and is present in each processor module 10. The PM inherent space forms multiple-address space for the total number of processor modules in the system. In the present embodiment, it is supposed that the amount of PM inherent space is approximately 2 GB.

The SSU space is common to all the processor modules 10. That is, the SSU space is formed by more than one shared storage module 12 and forms space which is common to the processor modules 12 in the system; it can also be directly accessed by the physical addresses of the processor modules 10. Thus, only data to be shared among all the processor modules 10 is stored in the SSU space.

In the present embodiment, the 2-GB SSU space is used as an example. As shown on the right side of the figure, the SSU space is further divided into eight partial SSU spaces #0 to #7 in a 256-MB unit. Each of the partial SSU spaces #0 to #7 is formed from one of the shared storage modules 12 of the present invention.

Moreover, the PM space of each processor module 10 is divided into LSU space and control space. Operands required by each processor module and its own data are stored in the LSU space, which is a part of the PM inherent space. It is the presence of the LSU, space that permits the number of accesses made by each processor module to the SSU space (formed by the shared storage modules 12) to be decreased.

If an access address designated by the central processing unit 18 of each processor module points to the LSU space, then closed access will be made within the processor module 10.

When the access address (physical address) designated by the central processing unit 18 points to the SSU space, the connection unit 22 of the processor module 10 recognizes that the access is being made to the SSU space and accesses a corresponding shared storage module 12 via the system bus 16.

By mapping the SSU space and the LSU space into the physical address space on the processor modules 10, it becomes possible for software to access the SSU space and the LSU space without needing to switch between the SSU space and the LSU space.

Since the SSU space is directly mapped into the physical address space of each processor module 10 as shown in FIG. 10, access to the SSU space formed of more than one shared storage module 12 may be made in the following two access modes.

① Program mode in which physical addresses are used to make direct access by software instructions of the central processing unit 18; or ② DMA mode in which a shared storage module to be accessed is selected and a data transfer between a processor module 10 and the shared storage module 12 is started by specifying an access address and the length of transfer.

The accessible SSU space varies with the access mode. In the present embodiment, the SSU space accessible by the program mode is only the 2-GB space which has been directly mapped into the physical address space of each processor module. In the DMA mode, however, by designating a shared storage module 12 to be accessed using its unit ID, it becomes possible to access much vaster SSU space, i.e., extended SSU space.

In the DMA mode access, the unit ID of a shared storage module 10 to be accessed is designated by the DID in the start transfer command SC shown in FIGS. 8 and 9 and the shared storage module is addressed by the following address A. Therefore, theoretically, it becomes possible to access extended SSU space having a capacity of $2^n$ (n is an address bit width of central processing unit 18 plus a bit width of the unit ID). That is, the extended SSU space forms extended spaces which are distinguished by the unit ID numbers serving, as identifiers.

Figure 11:
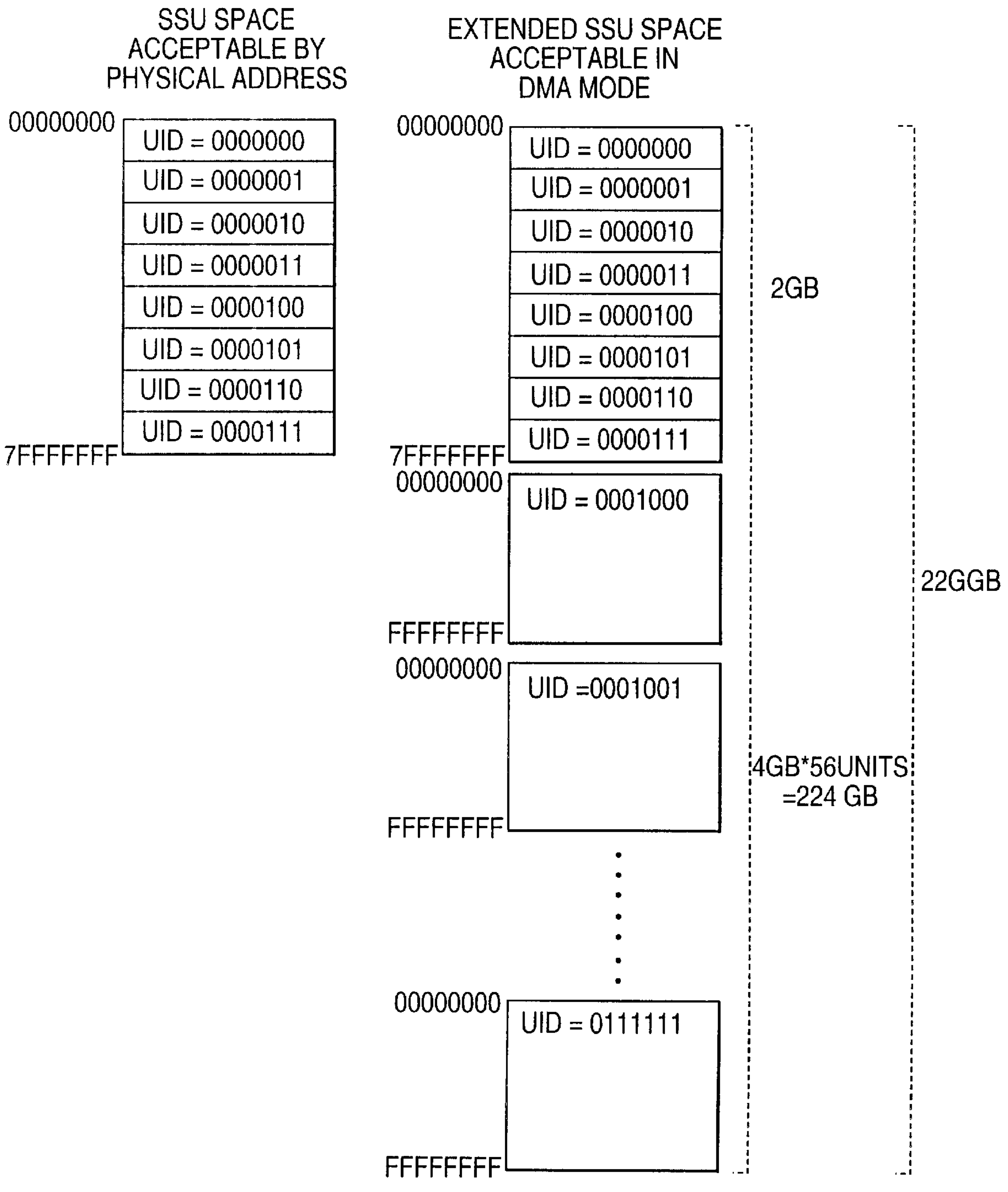
FIG. 11 is a diagram for explaining extended SSU space according to the present invention.

FIG. 11 is a diagram for explaining the SSU space which has been mapped into the physical address space of the processor module 10 and the extended SSU space which is accessible only in the DMA mode.

In FIG. 11, the number of bits of each of the unit ID numbers of the shared storage modules 12 constituting the extended SSU space is seven, and 64 unit ID numbers, 0000000 to 0111111, are assigned to the shared storage modules 12.

Here, eight unit ID numbers, 0000000 to 0000111, which are accessible in the program mode and the DMA mode are assigned to the 2-GB physical address space to be used for configuration definitions of the shared storage modules 12 constituting duplicate-shared storage (described later). The remaining 56 unit ID numbers corresponding to 56 SSU modules used in DMA mode are each assigned 4 GB. As a result, the extended SSU space of 226 GB in total can be accessed in the DMA mode.

Of course, the number of unit ID numbers is not limited to eight as shown in FIG. 11. FIG. 16 shared storage modules 000000 to 0001111, may be used to fully form dupliate-shared storage space (non-extended 2-GB space).

Moreover, by increasing the number of bits of the unit ID or the rate of assignment of the unit ID numbers to the shared storage modules 12, it is possible to extend the extended SSU space with the DMA mode access.

Although the SSU space of the present invention, which is accessible by the physical addresses, is formed by more than one shared storage module 12, all the memory devices for the SSU space need not be packaged; unpackaged areas may also exist. In addition, all or part of the SSU space may be duplicate-configured for fault-tolerance.

The unpackaged areas and the duplicate configuration, as shown in the SSU space of the processor modules 10 of FIG. 10, can be realized by dividing the SSU space of the processor modules 10 into partial SSU spaces and defining relationship with the shared storage modules 12 for each of the partial SSU spaces, that is, relationship with the shared storage modules 12 having the unit ID numbers 0000000 to 0000111 forming the extended SSU space shown in FIG. 11.

In the embodiment of FIG. 10, the 2-GB SSU space is divided into 8 spaces each of 256 MB and the configuration definitions indicating the correspondence relationship of each of the partial SSU. spaces #0 to #7 to the shared storage modules 12 are given.

The configuration definitions of the shared storage modules 12 are realized by operating the configuration definition register 44 (refer to FIG. 5) built in each connection unit 22. The configuration register 44 is constructed from a first control register 60 shown in FIG. 12 and second control registers 62-1 and 62-2 shown in FIG. 13.

The first control register 60 of FIG. 12 specifies the presence or absence of the shared storage modules 12 corresponding to the SSU space divided into 8 spaces each of 256 MB as shown in FIG. 10, in other words, whether the shared storage modules 12 are packaged or unpackaged. In this embodiment, FIG. 12 indicates that five partial SSU spaces #0, #1, #2, #4, #7 corresponding to I0, I1, I2, I4, I7 each indicated by a high bit "1" have been packaged and three partial SSU spaces #3, #5, #6 corresponding to I3, I5, I6 each indicated by a low bit "0" have not been packaged.

The second control registers 62-1 and 62-2 shown in FIG. 13 specify which of the shared storage modules 12 correspond to the partial SSU spaces indicated by high bits in the first control register, 60 and have thus been packaged, the simplex or duplicate configuration and the access sequence when the duplicate configuration is specified.

In this embodiment, only bits D0, D1, D2, D4, and D7 corresponding to the partial SSU spaces #0, #1, #2, #4 and

#7 are valid and specify the configurations of corresponding shared storage modules 12 and access forms. That is, bits D0, D1 and D7 are 0s, indicating that the partial SSU spaces #0, #1 and #7 are of simplex configuration. When partial SSU spaces #0, #1 and #7 are accessed, the shared storage modules 12 identified by the unit ID=0, 1, 7 are accessed.

On the other hand, bits D2 and D4 are "1", defining the duplicate configuration. When the partial SSU spaces #2 and #4 of duplicate configuration are accessed, data is read from the shared storage modules identified by the unit ID2 and the unit ID4.

The shared storage modules of duplicate configuration are written into as follows. In the first writing, a shared storage module 12 identified by the unit ID in the second control register 62-1 and 62-2 is written. In the second writing, another shared storage module 12 is written to which has the unit ID in which a specific bit in the first unit ID, for example, the least significant bit, is inverted.

A pair of duplex shared storage modules 12, which can be specified by the second control register 62-1 and 62-2 to take the duplex configuration, has unit ID numbers which are equal except for their least significant bits, e.g. 0000100 and 0000101.

In the embodiment of FIG. 13, two partial SSU spaces #2 and #4 are specified by bits D2 and D4=1 to take duplex configuration. For the partial SSU space #2, the following pair is set.

| Partial SSU space | Unit ID |
|---|---|
| #2 | 0000010 |
| #3 | 0000011 |
| For the partial SSU space #4, the following pair is set. | |
| #4 | 0000100 |
| #5 | 0000101 |

Figure 14:
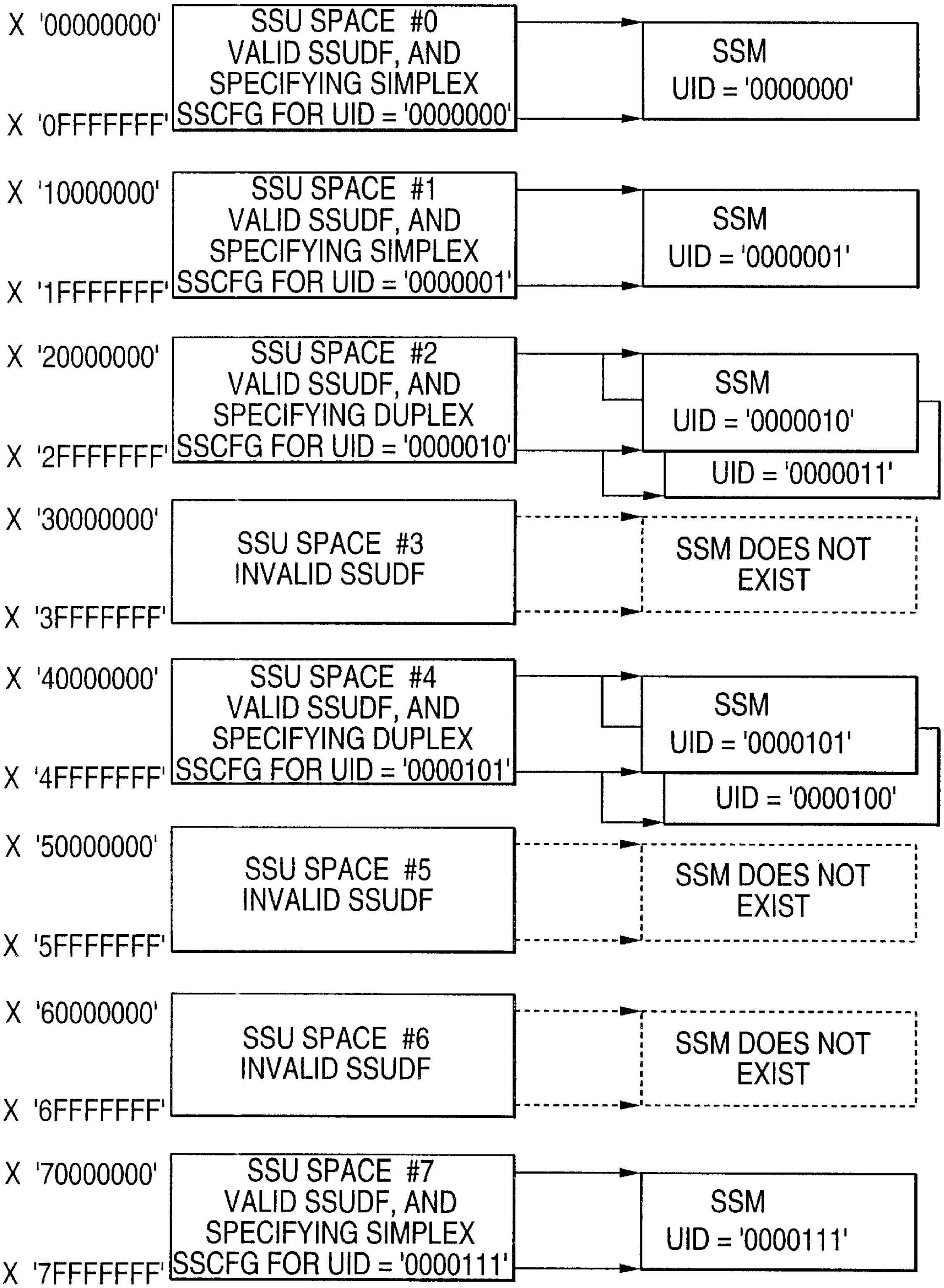
FIG. 14 is a diagram for explaining packaging of the shared storage modules corresponding to the configuration definitions of FIGS. 12 and 13.

FIG. 14 is a diagram for explaining the packaged state and configuration definitions of the shared storage modules 12 which are based on the specifications by the second control registers of FIGS. 12 and 13.

Eight shared storage modules 12 are provided to correspond to the SSU spaces #0 to #7 of the processor modules 10, but the shared storage module corresponding to the SSU space #6 is not packaged. Since the SSU spaces #3 and #5 are duplicated with the shared storage modules of the SSU spaces #2 and #4, respectively, no shared storage modules 12 corresponding to the SSU spaces #3 and #5 exist. The remaining SSU spaces #0, #1 and #7 have a one-to-one correspondence with the shared storage modules 12 because of their simplex configuration.

By dividing the SSU space which can be accessed by the physical addresses of the processor modules 10 and giving configuration definitions thereof as described above, it becomes possible to specify validity/invalidity or simplex/duplex configuration of the shared storage modules for each of the divided SSU space units even when the system is implemented.

In this embodiment, in the program mode in which the SSU spaces are directly accessed by the physical addresses based on the central processing unit software instructions, four bits b0 to b3 in the 32-bit SSU space address serve as a selector for the shared storage modules 12 and the remaining 28 bits b4 to b31 serve as an address of the shared storage units 12.

Where the memory capacity included in the shared storage modules 12 exceeds 256 MB, the meaning of the selector for selecting from among the shared storage modules 12 remains unchanged, but the internal addresses of the shared storage modules 12 are made to correspond to the memory capacity built into the shared storage modules 12. When, for example, the memory capacity is 512 MB, i.e. double 256 MB, 29 bits b3 to b31 of address information are used to designate internal addresses of the shared storage modules 12. When the memory capacity is 1 GB, 30 bits b2 to b31 are used to designate internal addresses of the shared storage modules 12. Moreover, when the memory capacity is extended up to 2 GB, 31 bits are all used to designate internal addresses of the shared storage modules. Where the memory capacity of the shared storage modules 12 exceeds 256 MB, the number of bits of the selector for selecting from among the shared storage modules decreases as described above. Thus, the same unit ID will be specified for the partial SSU spaces divided into 256-MB units.

Figure 15A:
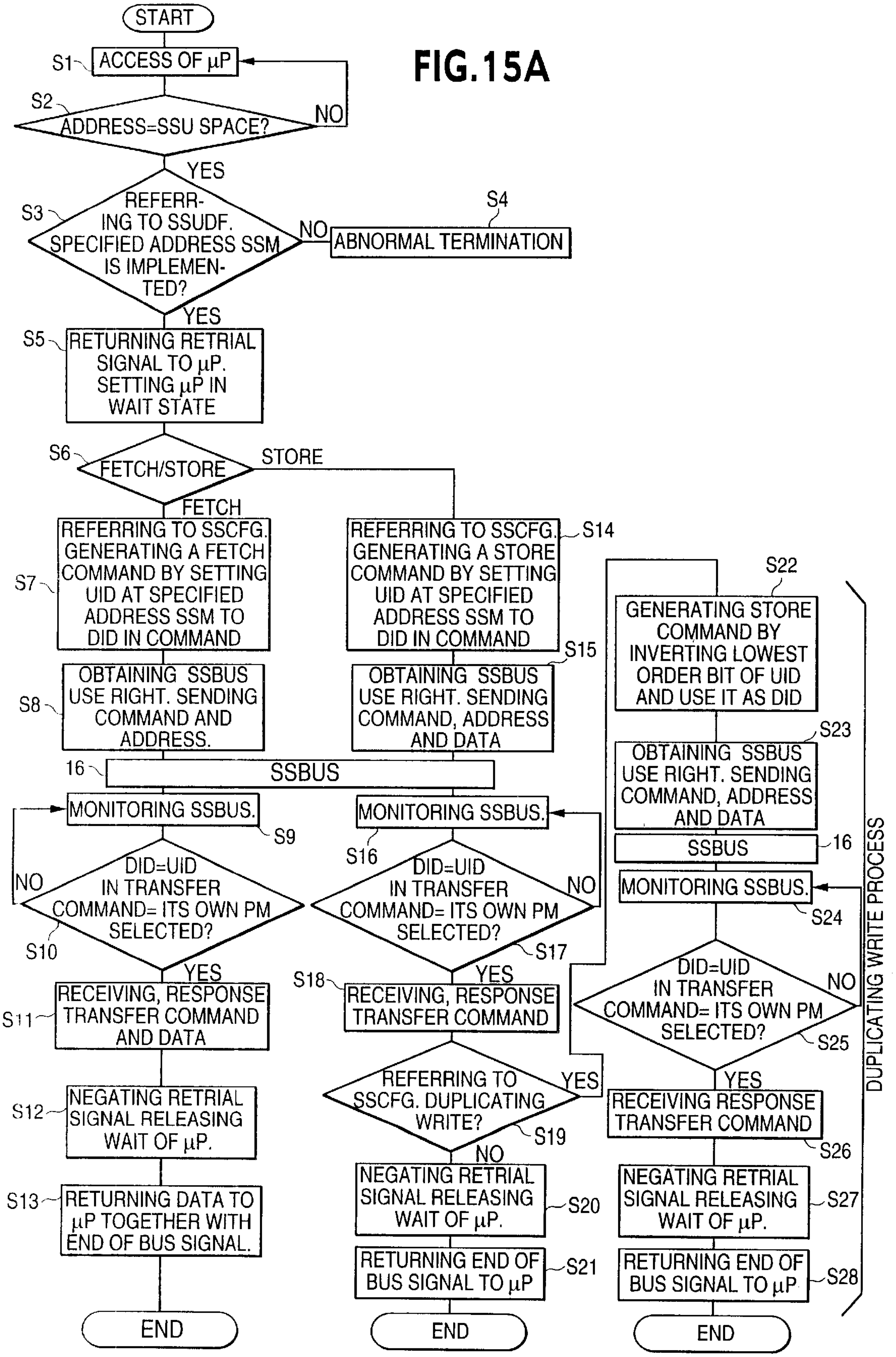
FIGS. 15A and 15B are flowcharts of an accessing process in the program mode according to the present invention.
Figure 15B:
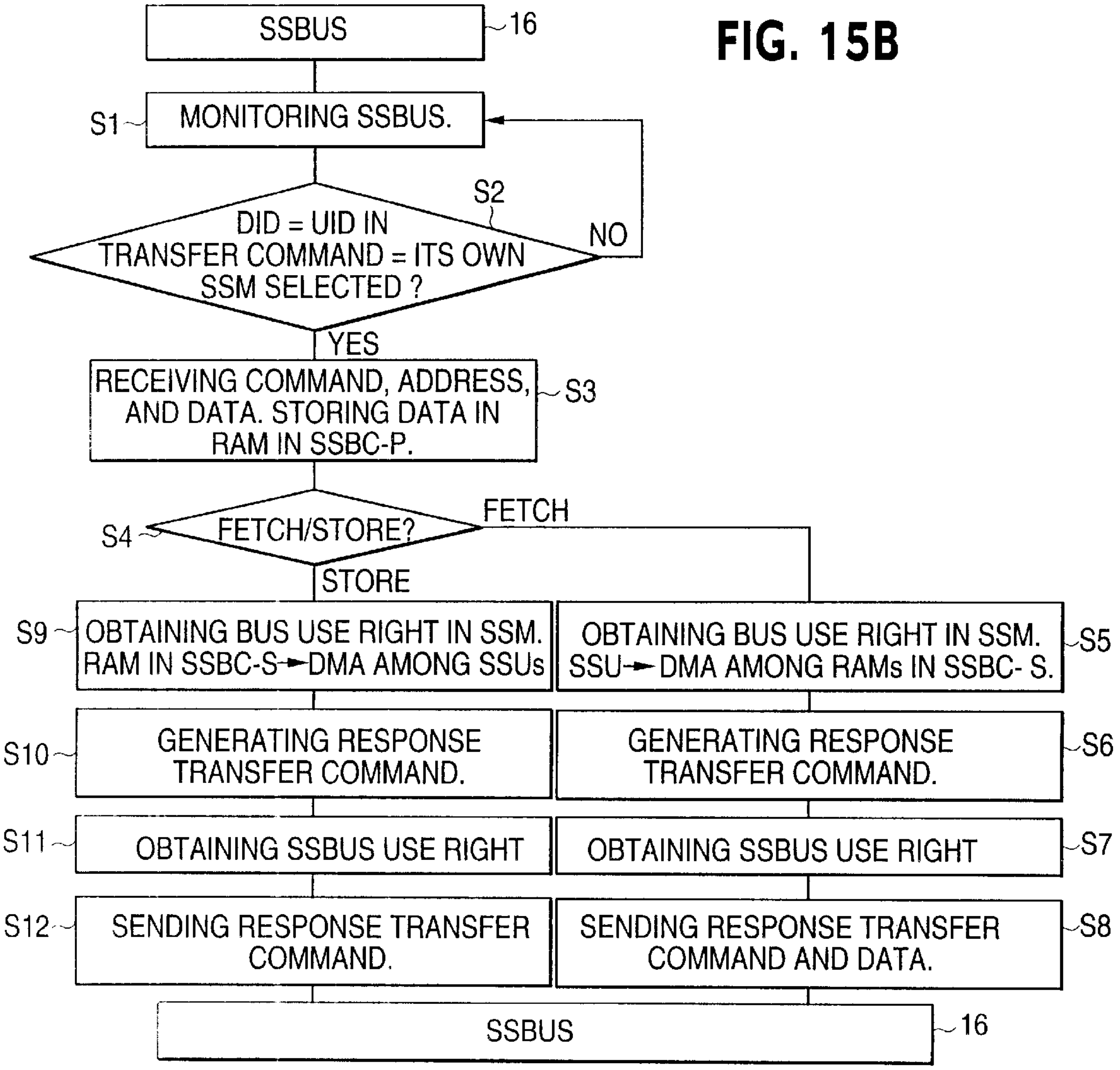

In the present invention, access in the program mode is made in accordance with flowcharts shown in FIGS. 15A and 15B.

In FIG. 15A, software accesses the SSU space as an instruction of the central processing unit 18 in step S1. In step S2, the connection unit 22 decides which of the shared storage units 12 has the addressed SSU space on the basis of four address bits b0 to b3 from the central processing unit 18 and the contents of the second control registers 62-1 and 62-2 for giving configuration definitions of the shared storage modules 12. Moreover, a decision is made in step S3 as to whether or not the shared storage module 12 specified by the contents of the first control register 60 has been packaged. If it has not, the operation will be terminated abnormally in step S4.

When it is decided in step S3 that the shared storage module 12 specified by the first control registers is packaged, the connection unit 22, in step S5, returns a retry signal to the central processing unit 18, so that the central processing unit 18 is placed in the wait state.

In step S6, a decision is made as to whether an instruction from the central processing unit 18 is a fetch instruction to read data from the shared storage module 12 or a store instruction to write data into the shared storage module 12.

If the instruction from the central processing unit 18 is a fetch instruction, a start transfer command SC is generated in step S7 from the contents of the second control registers 62-1 and 62-2 with the unit ID of the destination shared storage module used as the DID. After the bus right for the shared system bus 16 has been acquired in step S8, the start transfer command SC and address A are transmitted to the shared system bus 16.

If, on the other hand, it is decided in step S3 that the instruction is a store instruction, a start transfer command SC is likewise generated in step S14 from the contents of the second control registers 62-1 and 62-2 with the unit ID of the destination shared storage module used as the DID. In step S14, the start transfer command SC, address A and data D to be written into are sent onto the shared system bus 16 after acquisition of the bus right for the shared system bus 16.

In the shared storage module 12, on the other hand, as shown in the flowchart of FIG. 15B, the connection unit 28 monitors the shared system bus 16 in step S1 and compares its unit ID the DID in the start transfer command in step S2. When the comparison indicates equality, receive data is written into the built-in dual port RAM 56 in step S3.

In step S4, it is determined whether the instruction is a fetch instruction or a store instruction.

If it is a fetch instruction, the connection unit 28 permits data transfer between the dual port RAM 56 and the shared storage unit 26 under the control of the internal bus control circuit 64 in step S5 after acquisition of the bus right for the internal bus 30. In step S5, the connection unit 28 responds to the source processor module 10 at the termination of data transfer within the shared storage module 12.

That is, a response transfer command EC containing an end code is generated in step S6, bus right for the shared system bus 16 is acquired in step S7, and then the response transfer command EC and readout data D are sent onto the shared system bus 16 in step S8.

If in step S4 the instruction is determined to be a store instruction, the connection unit 28 permits data transfer between the dual port RAM 56 and the shared storage unit 26 in step S9 under the control of the internal bus control circuit 64 after acquisition of the bus right for the internal bus 30. The connection unit 28 responds to the source processor module 10 at the termination of the data transfer (the writing of data) within the shared storage module 12.

That is, a response transfer command EC containing a end code is generated in step S10, the bus right for the shared system bus 16 is acquired in step S11 and then the response transfer command EC is sent onto the shared system bus 16 in step S12.

Returning to the flowchart of FIG. 15A for the processor modules 10, the connection unit 22 monitors the shared system bus 16 as indicated in step S9 or S16 and compares its own unit ID with the DID in the response transfer command EC in step S10 or S17. When the comparison indicates equality in step S10 or S17, the response transfer command EC and data D are received in step S11 for a fetch instruction or the response transfer command EC is received in step S18 for a store instruction.

In subsequent step S12 or S20, a retry signal issued to the central processing unit 18 is withdrawn, so that the wait state of the central processing unit 18 is canceled. For a fetch instruction, an end signal DC of the internal bus 24 is returned to the central processing unit 18 together with received data D in step S13. For a store instruction, an end signal DC of the internal bus 24 is returned to the central processing unit 18 in step 20.

One access in the program mode is thus terminated.

The duplex writing process in steps S19 and S22 to S28 of FIGS. 15A is clarified herein later.

Figure 16A:
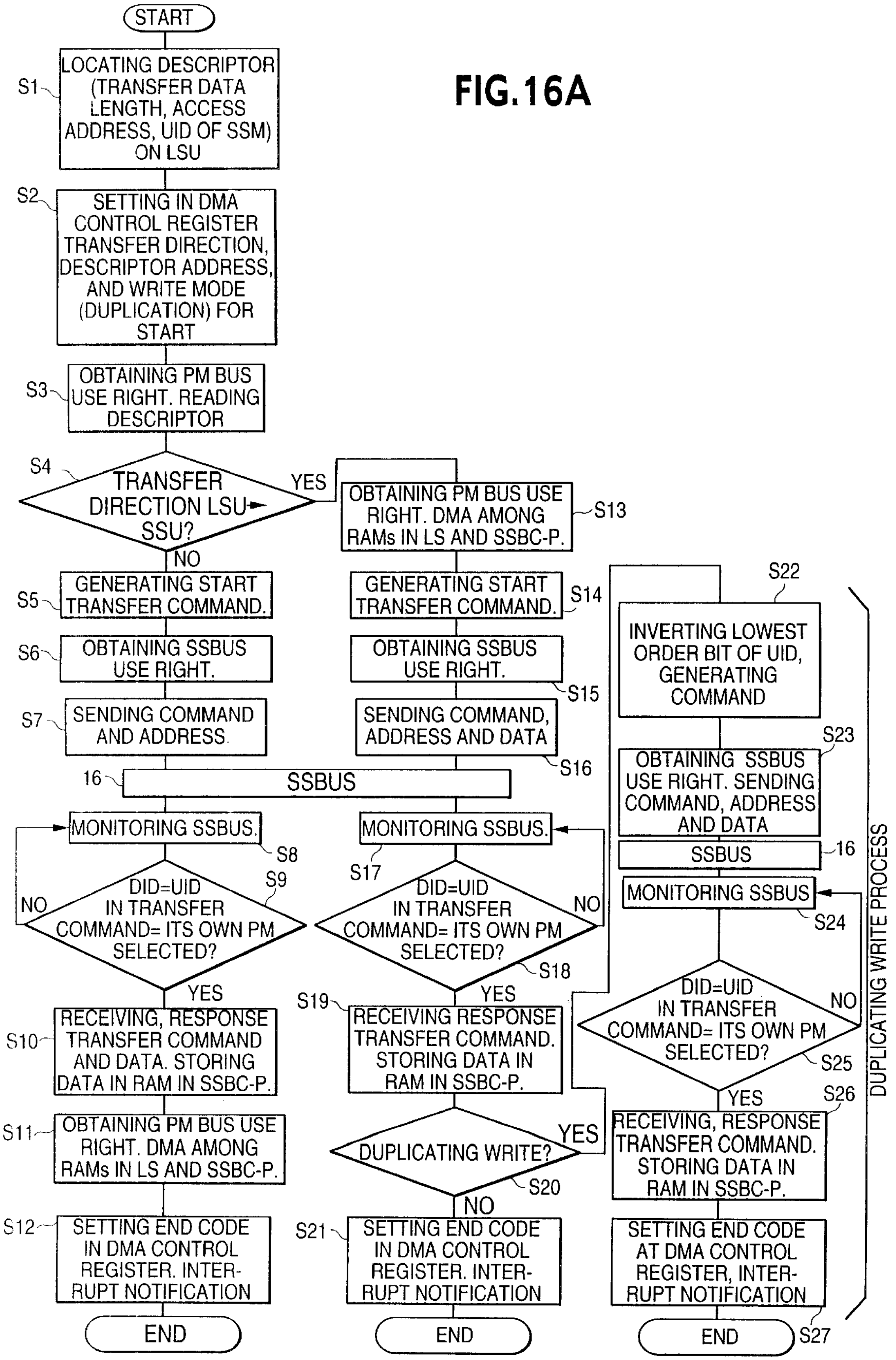
FIGS. 16A and 16B are flowcharts of an accessing process in the DMA mode according to the present invention.
Figure 16B:
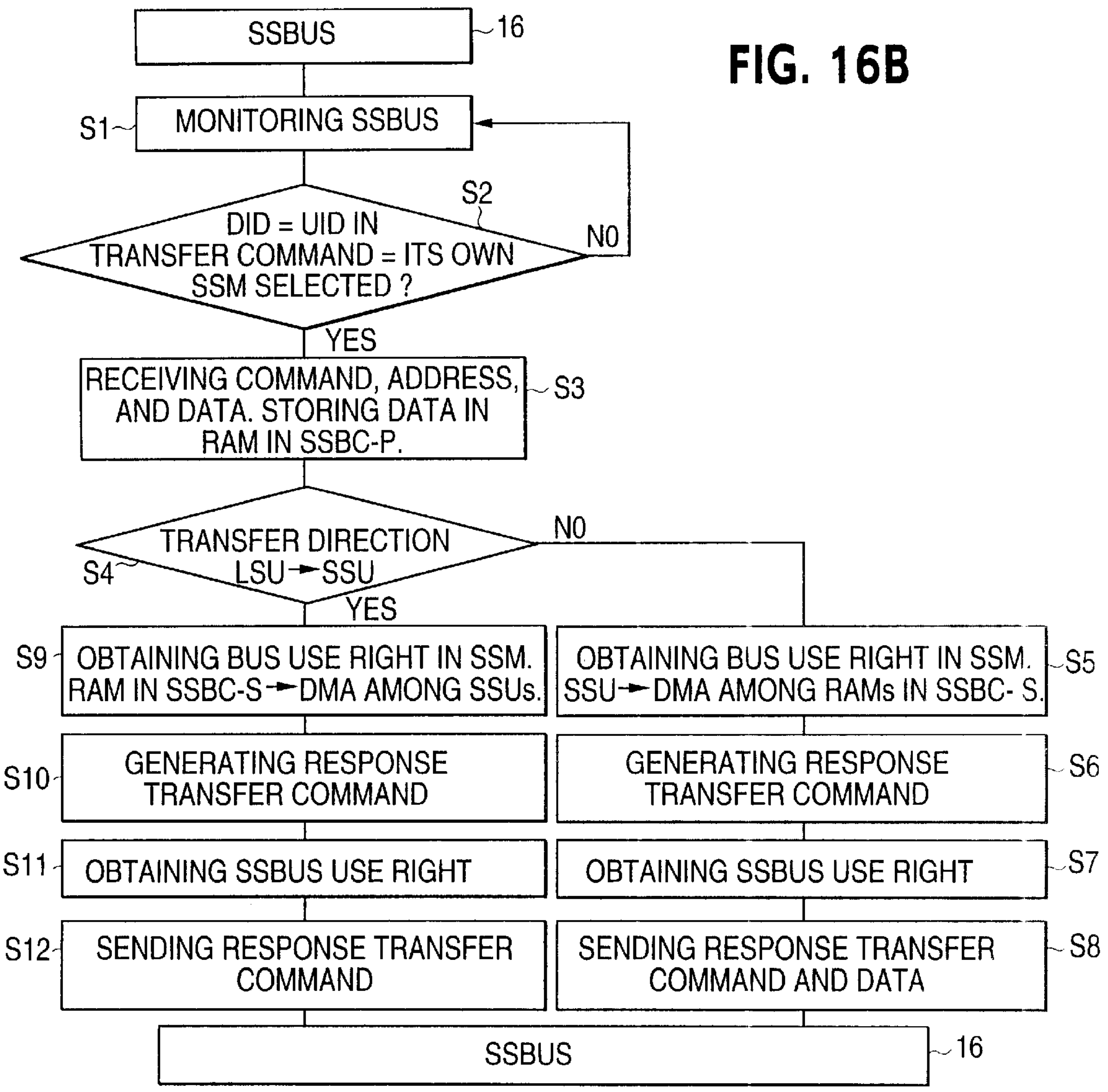

Next, reference is made to the flowcharts of FIGS. 16A and 16B to describe access in the DMA mode of the present invention.

Figure 17:
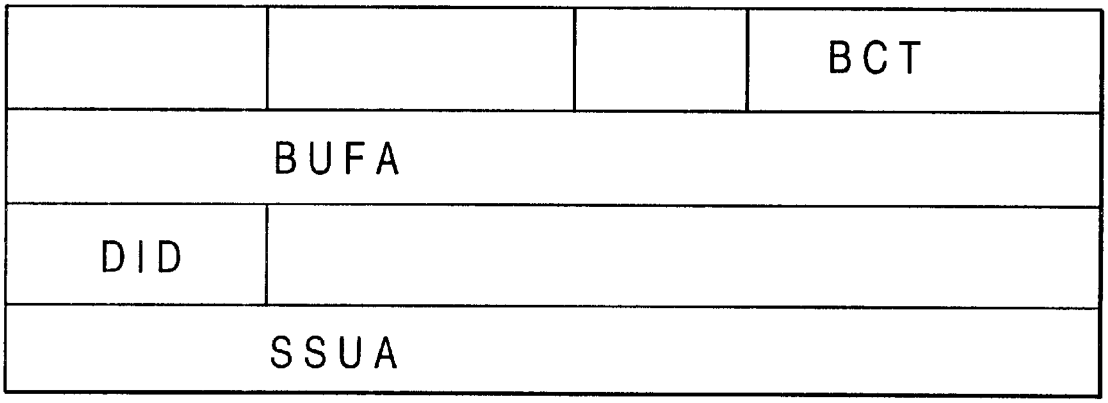
FIG. 17 is a diagram for explaining a descriptor used in the DMA mode access according to the present invention.

For access in the DMA mode, in step S1, the central processing unit 18 first places on the main memory 20 of the processor module 10 a descriptor containing control contents, such as the unit ID of a destination shared storage module 12, an access address, the transfer length, etc., shown in FIG. 17.

That is, in the descriptor of FIG. 17, the BCT (Byte Count) indicates the number of transfer bytes, the buffer address BUFA indicates the start physical address of the data buffer placed on the local storage unit 20, and the DID indicates the unit ID of a shared storage module which is a candidate for access. Moreover, the SSUA indicates a relative address (an internal address within the shared storage module 12 specified by the DID) within the shared storage module 12 to be accessed, which differs from the physical. address of the SSU space in the program mode.

After placement of the descriptor in step S1, the direction of transfer, control such as duplex writing into the shared storage modules 12 and the address of the descriptor on the local storage unit 20 is set in the DMA control register 50 of the DMA control circuit 34 in the connection unit 22 in step S2, which starts DMA mode access.

When the DMA mode access is started in step S2, the connection unit 22 acquires the bus right for the internal bus 24 of the processor module, 10 and becomes a bus master. Thus, the connection unit 22 is permitted to directly access the local storage unit 20 under the control of the DMA control circuit 34 to thereby read the descriptor from the local storage unit 20 and permit data transfer from the local storage unit 20 to the dual port RAM 38 in the connection unit.

After termination of data transfer to the dual port RAM 38 in the connection unit 22, the direction of data transfer is checked in step S4. If the readout data transfer direction is from the shared storage module 12 to the local storage unit 20 (hereinafter referred to as (SSU-LSU) direction), a start transfer command SC containing the unit ID of the shared storage module 12 and the length of transfer as shown in FIG. 7 is generated by the transmitter-receiver circuit 36 in step S5. On the other hand, if the write data transfer direction is from the local storage unit 20 to the shared storage module 12 (hereinafter referred to as (SSU-LSU) direction), the transfer start command SC is likewise generated by the transmitter-receiver circuit 36 in step S13.

Subsequently, the transmitter-receiver circuit 36 acquires the bus right for the shared system bus 16 in steps S6 and S14.

If the transfer is in the (SSU-LSU) direction, the operation proceeds from step S6 to step S7, so that the start transfer command SC and the address A are sent onto the shared system bus 16. If the transfer is in the (LSU-SSU) direction, the operation proceeds from step S15 to step S16, so that the start transfer command SC, address A and data D are transmitted to the shared system bus 16.

On the other hand, the connection unit 28 of the shared storage module 12 monitors the shared system bus 16 in step S1 of FIG. 16B and compares its unit ID with the DID in the start transfer command DC in step S2. When the comparison indicates equality, the connection unit writes received data into the dual port RAM 56 in step S3.

Next, the transfer direction is checked in step S4. When the transfer is in the (LSU-SSU) direction, the operation proceeds to step S5. When the transfer is in the (SSU-LSU) direction, the operation proceeds to step S9. In step S5 or S9, the internal bus control circuit 64 of the DMA control circuit 52 in the connection unit 28 acquires the bus right for the internal bus 30, so that data transfer is permitted between the dual port RAM 56 and the shared storage unit 26. In this case, data is read from the shared storage unit 26 in step S5, while data is written into the shared storage unit 26 in step S9.

When access in the DMA mode is terminated in step S5 or S9, the response transfer command EC containing the end command shown in FIG. 7 is generated in step S6 or S10 and the bus right for the shared system bus 16 is acquired in step S7 or S11. Then, the operation proceeds to step S8 or S12. That is, in step S8 in which (LSU-SSU), readout data D is added to the response transfer command EC and then transmitted to the shared system bus 16. In step S12 in which (SSU-LSU), the response transfer command EC is transmitted to the shared system bus.

Returning now to the flowchart of FIG. 16A for the processor modules 10, the connection unit 22 of the processor module 10 monitors the shared system bus 16 as in step S8 or S17. When equality is found between its unit ID and the DID in the response transfer command, the operation proceeds to step S10 or S19 for a receiving operation. The received data is stored in the dual port RAM 38 in the connection unit 22.

Subsequently, for transfer in the (SSU-LSU) direction, thee bus right for the internal bus 24 is acquired in step S11, so that data D received by the dual port RAM 38 is transferred to the local storage unit 20 under the DMA control. Finally, the end code is set in the DMA control register 50 in step S12 and the completion is notified to the central processing unit 18 as an interruption signal.

For transfer in the (LSU-SSU) direction, the operation proceeds to step S21 via step S20, whereby the end code is set in the DMA control register 50 and the completion is notified to the control processing unit 18 as an interruption signal.

One-time access in the DMA mode is thus terminated.

The duplex writing process in steps S20 and S22 to S27 will be clarified later.

The shared storage modules 12 constituting the SSU space of the present invention can be duplicated for fault-tolerance. When duplex shared storage modules 12 are accessed, the writing operation is performed on both of the duplex shared storage modules, while the reading operation is performed on one of the shared storage modules 12.

The write access to the duplex shared storage modules 12 is carried out by hardware control of the connection unit 22 in response to one access instruction from the central processing unit 18 based on software. The write access to the duplex shared storage modules 12 is not made simultaneously for reasons of hardware control. That is, the writing operation is first performed on one of the shared storage modules 12 and, when the first writing operation is completed, the other is written into. The specific accessing methods vary between the program mode and the DMA mode.

The duplex accessing method in the program mode is performed in accordance with the process in steps S19 and S22 to S28 shown in FIG. 15A.

That is, the first store access is processed in the same manner as in the simplex configuration. When, in step S18, a response transfer command EC indicating normal termination is received at the termination of the first write access to the shared storage module 12, a reference is made in step S19 to the second control registers 62-1 and 62-2, which define configuration of the shared storage module.

Into the second control registers 62-1 and 62-2 are entered a bit for specifying the duplex configuration of shared storage modules, the unit ID of a shared storage module to be read from and the unit ID of a shared storage module to be written into first.

When a reference is made to the second control registers 62-1 and 62-2, if the shared storage module to be accessed is defined as simplex configuration, then the connection unit 22 terminates the write access to the shared storage module and the operation is proceeded to step S20.

When the duplex configuration is defined, in step S22, a transfer start command SC for store is generated as a DID of which is equal to the unit ID of the shared storage module, which is specified first in the second control registers and has already been subjected to access, except the least significant bit. In subsequent step S23, the bus right for the shared system bus 16 is acquired to transmit the start transfer command SC, address A and data D which is the same as that in the first access and accesses the other of the duplex-configured shared storage modules.

In the second access, with the first access, the process indicated in steps S1 to S4 and S9 to S12 of FIG. 15A is performed by the shared storage modules and, finally, a response transfer command EC containing a end code is transmitted to the shared system bus 16.

Data transferred from the shared storage module is monitored in step S24 of FIG. 15A and, when equality is found between its own unit ID and the DID in step S25, the response transfer command EC is accepted in step S26. Thereby, as in steps S12 and S13, a set of store accesses to the duplex-configured shared storage modules is terminated.

By setting configuration definitions of the shared storage modules 12 in the second control registers 62-1 and 62-2 as described above, when the central processing unit 18 makes program-mode access (access to the SSU space) to a physical address of a shared storage module 12 on the basis of software, the processor side connection unit 22 checks whether the shared storage unit 12 is of simplex configuration or duplex configuration and is able to automatically change the unit ID to make the second access at the termination of the first access if it is of duplex configuration.

Even if a shared storage module 12 specified in the second control registers 62-1 and 62-2 is defined as duplex configuration, one of the duplex shared storage modules may be disabled against access because of a fault therein. A situation in which a compressed operation has to be temporarily employed can be coped with by changing the operation mode of the second control registers from the duplex configuration mode to the simplex configuration mode when the abnormal end code is found in the response transfer command EC obtained at the termination of access.

When, at the time of double-mode access, access to shared storage modules 12 is terminated abnormally, it is possible to check the presence or absence of equality of the contents of two duplex shared storage modules as well as the access sequence based on the unit ID of the abnormal shared storage module 12 and the contents of the second control registers 62-1 and 62-2. In the program mode in particular, since the success or failure in access can be basically recognized on a word-by-word basis, even if data equality is lost between the duplex-configured shared storage modules 12, the recovery process has only to be performed taking into account unequal words and the shared storage module 12 which has failed to be accessed.

Next, the DMA-mode duplex accessing method is illustrated in steps S20, S22 to S27 of FIG. 16A.

That is, the first DMA access in which data transfer is in the (LSU-SSU) direction is processed in the same manner as in the simplex configuration. After a response transfer command EC indicating normal termination of the first access to the shared storage module 12 is received in step S19, the presence or absence of the definition of duplex writing is checked in step S20.

Although the DMA-mode access is started by selecting an object shared storage module 12 and specifying an access address of the shared storage module 12 and the length of transfer, the direction of transfer and simplex/duplex configuration are specified in the DMA control register 50 of the connection unit 22 every time started.

For this reason, in step S20, reference is made to the DMA control register 50 defining the configuration of the shared storage module 12 to check the presence or absence of the definition of duplex writing.

As a result of the reference to the DMA control register 50, if the shared storage module to be accessed is defined as simplex configuration, the process advances to step 21 and the connection unit 22 terminates access to the shared storage module 12 with only one write access.

However, if the duplex configuration is defined, a transfer start command SC for writing is generated in step S22 and has the same DID as the unit ID of the shared storage module, which is first designated in the DMA control register 50 and has already been accessed, except the least significant bit. In subsequent step S23, the bus right for the shared system bus is acquired to transmit the start transfer command SC, address A and data D which is the same as that in the first access to the shared system bus 16, and makes DMA write access to the other of the duplex-configured memory modules.

In the second DMA access, as with the first, the process in steps S1 to S4 and S9 to S12 shown in FIG. 16B are performed by the shared storage modules, and finally a response transfer command EC containing a end code is transmitted to the shared system bus 16.

That is, data transferred from the shared storage module is monitored in step S24 of FIG. 16A and, when an equality is found between its own unit ID and the DID in step S25, the response transfer command EC is accepted in step S26. As in steps S11 and S12, DMA access writing into the duplex shared storage modules is terminated in steps S26 and S27.

As with the duplex writing in the program mode, in the DMA mode as well, if the mode of operation is specified, the duplex writing is automatically performed by the hardware.

Where abnormal termination occurs during DMA access to the duplex shared storage modules, it is possible to check data equality between two duplex shared storage modules as well as the access sequence based on the unit ID being accessed and the least significant bit of the unit ID of the shared storage module specified at the time of the first access.

Although more than one processor module is indicated in the embodiment of FIG. 2, the system may comprise a single processor module.

In the program mode of the present invention in which an SSU space is accessed, a write/read process and the execution of an instruction are completed synchronously, that is, by the synchronous access method, as shown in FIG. 15A. If accesses are grouped in block units, responses to accesses can be returned at a higher speed. Additionally, the utilization of the shared system bus 16 can be reduced, thereby improving the system performance. When accesses to an SSU space are grouped in block units, a write process and the execution of an instruction are completed asynchronously.

Figure 18:
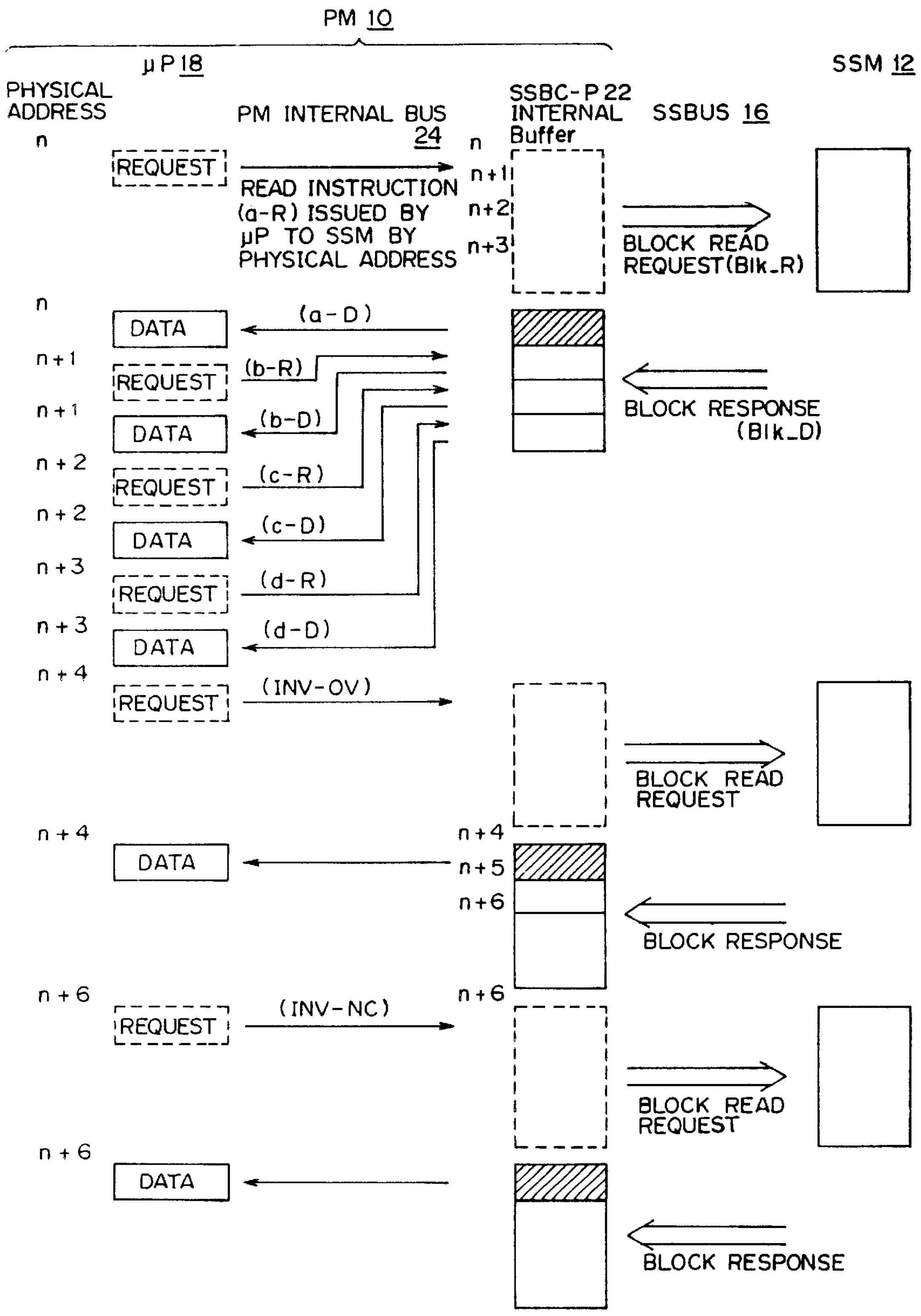
FIG. 18 is a block diagram for explaining the SSM reading operation in the asynchronous program mode in the present invention.

FIG. 18 is a block diagram for explaining the operation in which a reading operation is performed as a block access to the shared storage module 12 in the asynchronous program mode.

In FIG. 18, in response to a one-word read request (a-R) issued according to software to the shared storage module 12 by the central processing unit ($\mu$P) 18 of the processor module 10, the connection unit 22 issues a block read request (Blk-R) having the leading address n to the shared storage unit 12 through the shared system bus 16. In this embodiment, the block read request (Blk-R) comprises four words, that is, address n, n+1, n+2, and n+3.

The connection unit 28 on the side of the shared storage unit 12 receives the block read request (Blk-R) transmitted from the shared system bus 16, and sends to the connection unit 22 of the processor module 10 the data comprising four words (Blk-D), that is, address n, n+1, n+2, and n+3, read from the shared storage unit 26.

The connection unit 22 of the processor module 10 receives the data (Blk-D), stores it in the buffer (dual port RAM 38) in the connection unit 22, and returns to the central processing unit 18 data (a-D) corresponding to the read address n in the shared storage module 12.

If subsequent access requests refer to serial areas (b-R), (c-R), and (d-R), data (b-D), (c-D), and (d-D) can be returned quickly from the buffer in the connection unit 22 because they are already stored in the buffer of the connection unit 22 by the previous block access.

Data stored in the buffer of the connection unit 22 are invalidated when the next access request refers to an area (INV-OV) not located in the buffer as indicated by the physical address n+4, or when it does not refer to a serial address (INV-NG) as indicated by the physical address n+6. In these cases, the shared storage module 12 is accessed in the program mode in, which data are accessed in word units, only the data at the corresponding addresses among the read block data are returned to the central processing unit 18.

Figure 19:
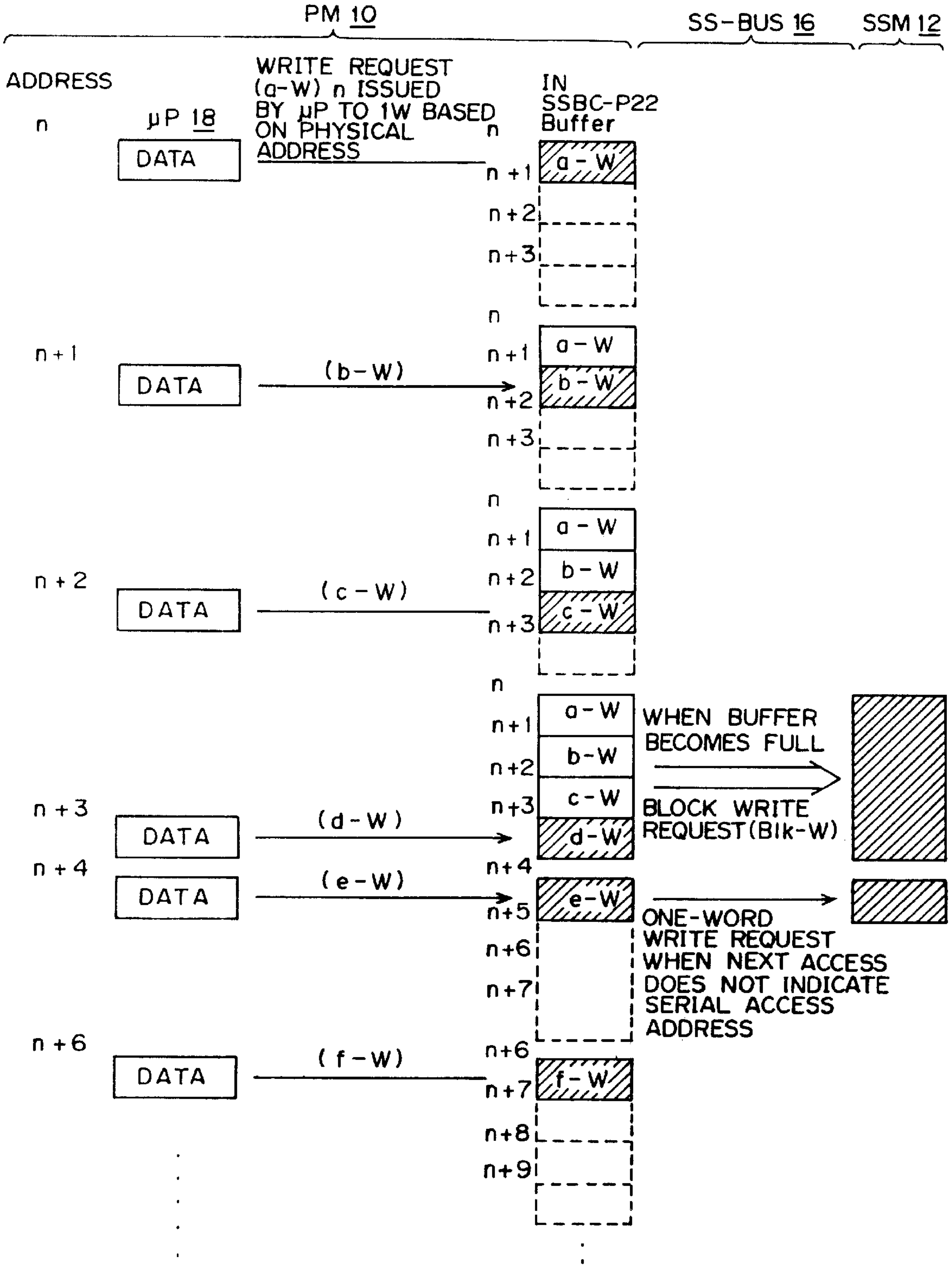
FIG. 19 is a block diagram for explaining the, SSM writing operation in the asynchronous program mode in the present invention.

FIG. 19 shows an SSU writing operation in the asynchronous program mode of the present invention in which data are accessed in block units.

In FIG. 19, a write request (a-W) and data issued according to software to the shared storage module 12 at the physical address n by the central processing unit ($\mu$P) 19 of the program module (PM) 10 are stored in the buffer (dual port RAM 38) in the connection unit 22. Four-word write requests (b-W), (c-W), and (d-W) having serial addresses as indicated by the physical addresses n+1, n+2, and n+3 are issued to the buffer of the connection unit 22. When the buffer becomes full, a block write request (Blk-W) is issued to the shared storage module 12 by the connection unit 22 through the shared system bus 16. Thus, the block is written to the storage.

When a condition of a write request (e-W) not having a serial access address as indicated by the physical address n+4 is detected, a write request (E-W) in the program mode in which data are transmitted in word units is issued to the shared storage module 12. Thus, the data are written in word units.

In the present invention, since block write instructions are executed asynchronously, processes for exceptions detected after the completion of an instruction (for example, an access to an SSM area which is not packaged, a hardware error on a system bus, etc.) should be considered. Asynchronous execution of instructions indicates that the completion of a write instruction execution and that of the actual writing operation are performed asynchronously. When an exception is detected in the synchronous operation of instructions, the software can recognize according to the data stored in the stack as easily as in the prior art technology as to what instruction has failed if an exception interrupt is generated synchronously with the instruction. However, since the asynchronous operation of instructions such as a block write instruction are performed in the present invention, a defective instruction cannot be recognized usually. Therefore, when an exception has arisen, that is, when an actual write by hardware has failed, a recovery process is required upon the rejection of a write process in the asynchronous operation of instructions.

To simplify the software recovery process of the present invention, a write serialize instruction is provided to ensure the completion of a write process and is added to the end of the write instruction. When the write serialize instruction is issued, the hardware immediately executes the write request stored in the buffer, and completes the execution of the serialize instruction. The serialize instruction is completed when the write process is completed. If an exception has arisen during the writing operation, an exception interrupt is generated synchronously with the serialize instruction. Accordingly, a write to hardware and the execution of the instruction can be performed synchronously if a serialize instruction is added to the end of a specific write unit (more specifically, a write instruction unit). That is, executing a serialize instruction is completing an actual writing process by hardware.

Some write processes do not have serial addresses and are performed as one-word writing operations, while those having serial addresses are performed as block writing operations.

The physical address n+4 shown in FIG. 19 is followed by an access to n+6. Then, a write request (E-W) is issued to the shared storage module 12 when a condition of a write request (e-w) not having a serial address is detected or when the serialize instruction is issued. Thus, the data stored in the buffer are written to the storage.

When a block is transmitted to a shared storage, the execution of an instruction is completed synchronously when read data in the reading operation reach the CPU. However, since a write operation is performed by writing data to the storage after the completion of the execution of a CPU instruction, an appropriate action must be taken when an exception (for example, a parity error detected in a bus and a program exception, etc.) has arisen at the time of a write process.

Figure 20A:
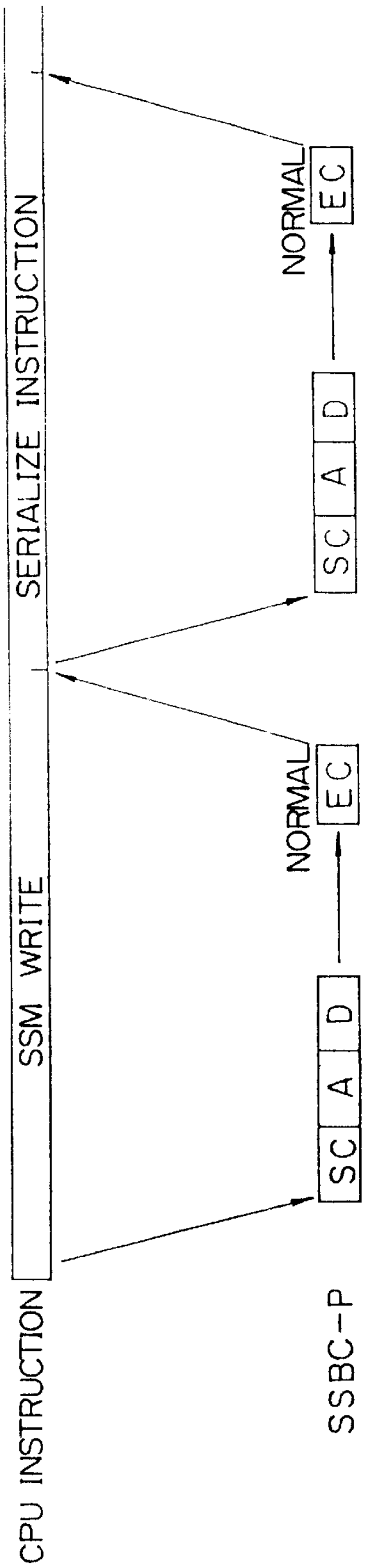
FIGS. 20A and 20B are the timing charts for explaining the operation of the prior art technology.
Figure 20B:
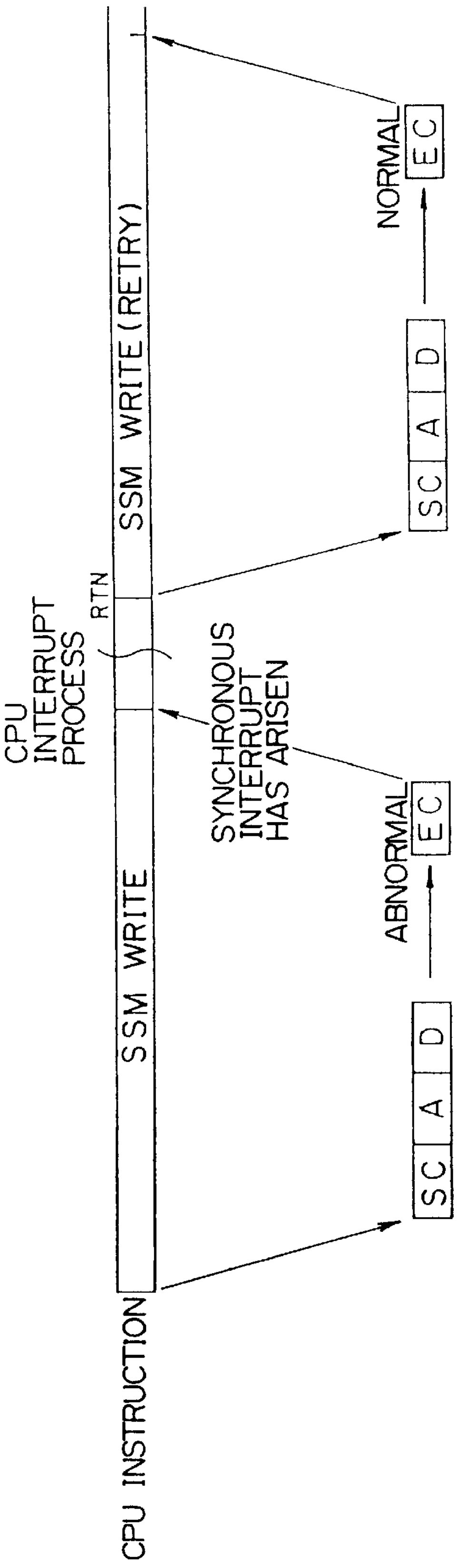

Conventionally, a command (SC), an address (A), and write data (D) are outputted from an SSBC-P to an SSM if only an SSM write instruction is issued as a CPU instruction when the SSM write instruction and a process of writing to a storage are performed synchronously as shown in the timing charts in FIGS. 20A and 20B. When the writing operation is performed. normally, an end command (EC) indicating the normal state is returned to the CPU side through the SSBC-P as shown in FIG. 20A. However, when the writing operation is performed abnormally, an end command (EC) indicating the abnormal state is returned to the CPU side through the SSBC-P. In this case, the above described synchronous interrupt is generated, synchronously with the write instruction using the synchronous instruction interrupt mechanism provided for the CPU. After storing an access address and data to be stored into a stack, etc., the CPU branches to an interrupt routine. An interrupt handler obtains information required to recover a retry process from stack information. When a process of retrying a writing operation to the SSM is performed successfully, an EC is returned. In such a conventional method of a synchronous writing, the CPU cannot execute other instructions in writing to the SSM, thereby taking much time in executing all instructions.

By contrast, in the operation of the present invention (rejection of a write process), a CPU instruction goes ahead, and a write process is performed at a high speed. However, when an exception is detected, a write address and data to be stored may have been updated by an instruction after the rejected right process. Therefore, the necessary recovery cannot be performed by the conventional synchronous interrupt function provided for the CPU. That is, when a write process is rejected according to the present invention and only the conventional function is used to recover the abnormal state, there are problems as follows:

① an exception is detected asynchronously with a CPU instruction, therefore, a simple instruction synchronous interrupt is not valid, and ② information necessary for a recovery process does not exist at the time of the detection of an exception, and the recovery process cannot be performed.

The following architecture is provided by the present invention to solve the problem above:

(1) A Serialize Instruction for a Write Process

A serialize instruction is provided to write data to a shared storage. The serialize instruction is executed as an access to a specified address in the specific PM space. The execution of the serialize instruction is completed synchronously with a process of writing data to a shared storage which has been suspended.

(2) A Notification of an Exception to be Given to the CPU

An exception is notified to the CPU by the instruction synchronous interrupt function. The interrupt is synchronized with an access to a shared storage or with execution of a write serialize instruction of (1) above. When an interrupt is made synchronously with the execution of a serialize instruction, it indicates a failure in the immediately preceding writing operation. When an interrupt is made synchronously with an access to a shared storage, it is not clear whether the interrupt is caused by an access instruction to the shared storage which generates the direct interupt (serialize instruction following to a write or a read instruction) or an immediately preceding write instruction to the shared storage just before, but a flag is set in the control register of the SSBC-P to determine whether the interrput is caused by an access instruction which generates the immediately preceding instruction or a write instruction which generates the immediately preceding interrupt. Then, the flag is read as a control register in the SSBC-P to determine the cause of the interrupt.

(3) A Recovery Process

An instruction which has failed in its access can be specified by (1) and (2) above. However, the information necessary for a recovery process (a retry process) is not designated. To solve this problem, the SSBC-P suspends all the information relating to unsuccessful writes of block units. Furthermore, if there is a CPU instruction to retry suspended accesses, there is a function to retry the suspended accesses. According to the function, the interrupt handler can perform a recovery process without obtaining or analyzing the information about exceptions.

(4) Canceling a Retry

If an exception is caused by software, an exception will occur repeatedly when the above described function is used to recover the process. In such cases, the retries suspended by the SSBC-P must be canceled. When a control register for canceling the suspended retries is provided in the SSBC-P and the interrupt handler determines that the system cannot be retried at all, the suspended retries are canceled by accessing the register.

Figure 21A:
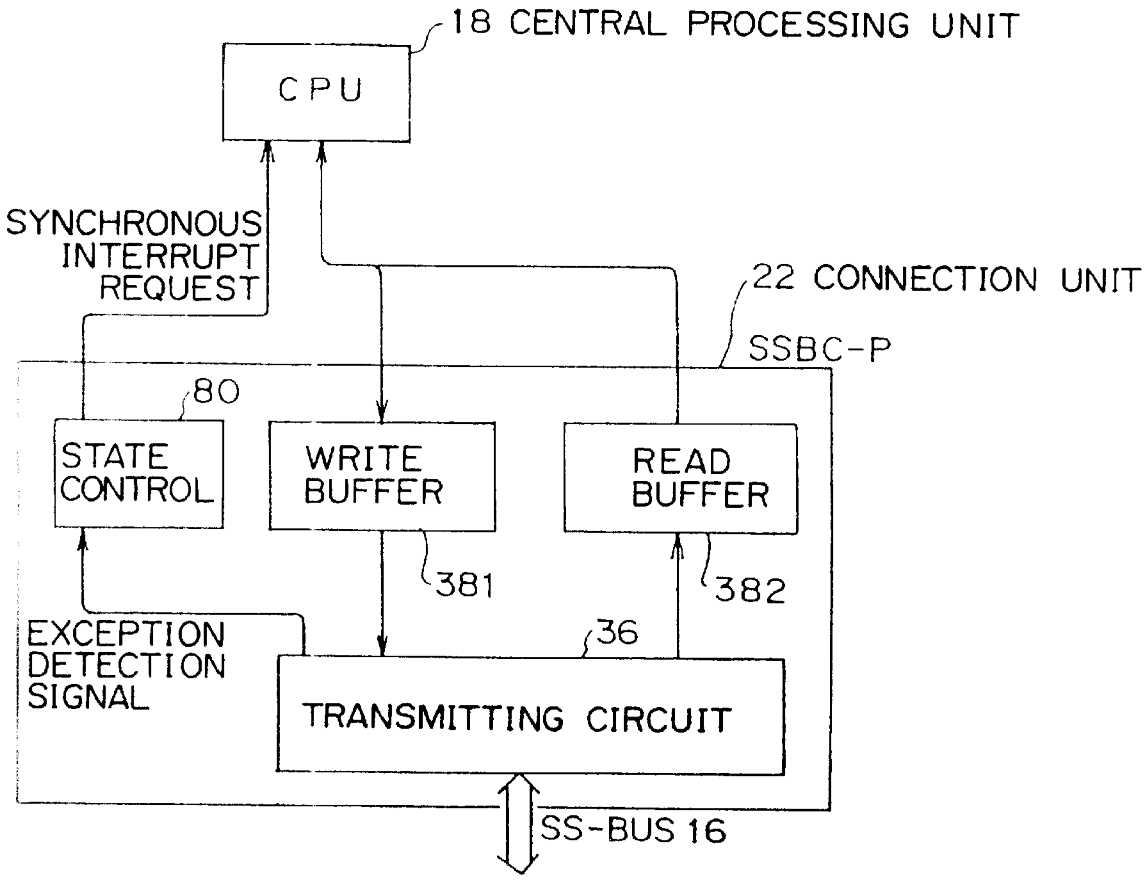
FIG. 21A shows the configuration of the connection unit on the side of the processor which receives a serialize instruction and performs the state control according to the present invention.

FIG. 21A shows the configuration of the connection unit 22 (SSBC-P) associated with the processor. The connection unit 22 comprises a write buffer 381, a read buffer 382, and a transmitter-receiver ciucuit 36 for controlling the SS-BUS. It also comprises a state controller 80 for controlling the state corresponding to a write serialize instruction. When an access to a shared storage fails and an exception is detected, the state controller 80 inputs an exception detection signal and retries the access (recovery process) and issues a synchronous interrupt request to the CPU.

Figure 21B:
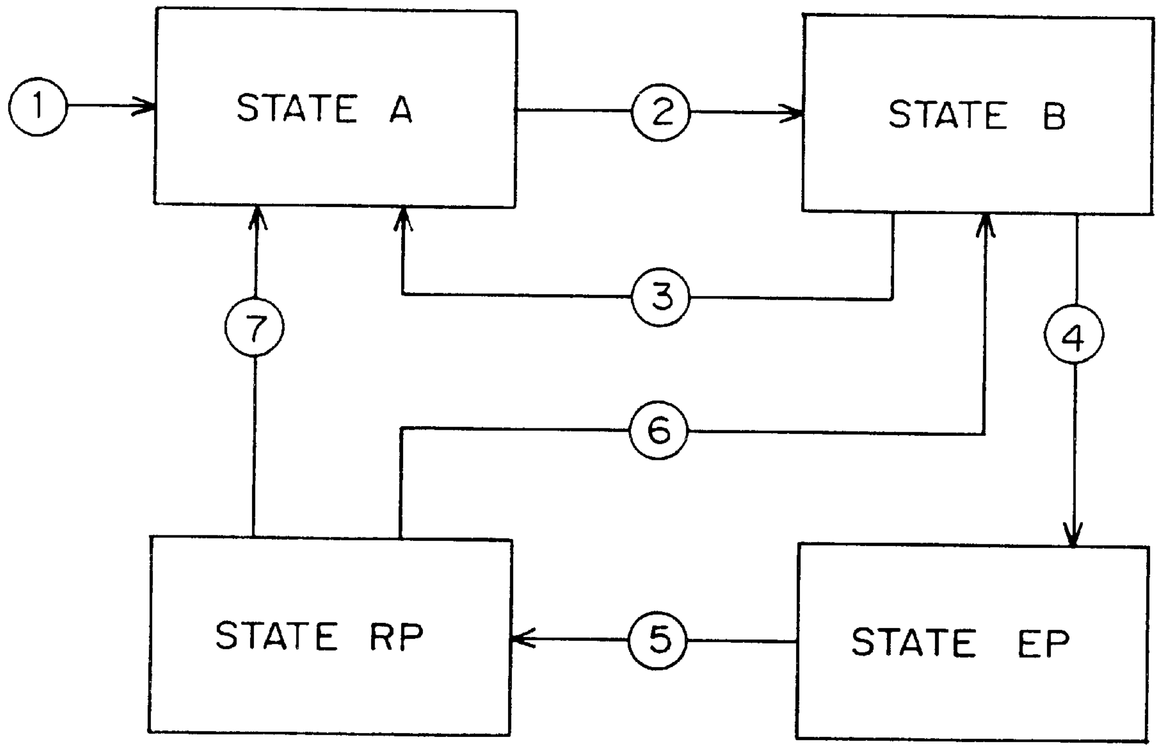
FIG. 21B shows the transition of the state of the state controller in the connection unit.
Figure 21C:
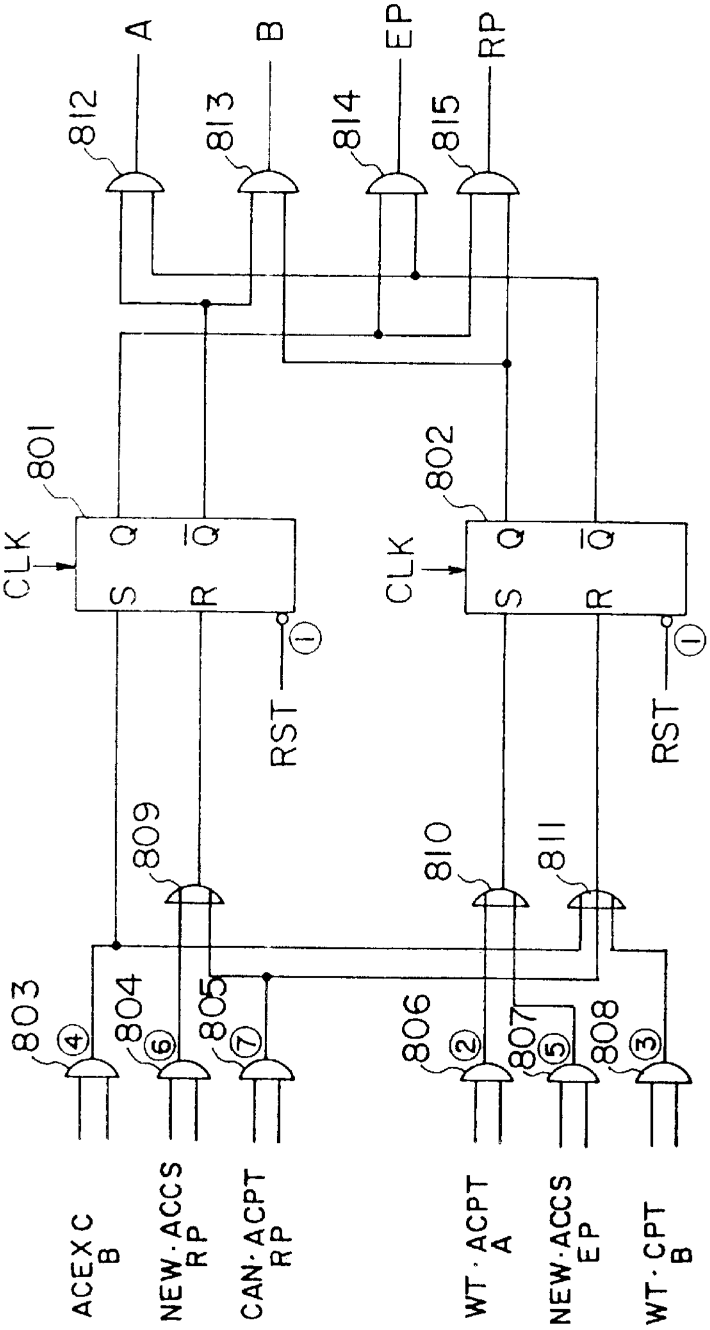
FIG. 21C shows the state transition circuit.

FIG. 21B shows the state transition of the operation state of the state transition circuit shown in FIG. 21C in the state controller 80 provided in the connection unit 22 (SSBC-P) for controlling a writing operation to a shared storage to realize the above described architecture. In the explanation below, each of the numbers ①–⑦ corresponds to the number indicated in the state transition diagram (FIG. 21B) and the state transition circuit (FIG. 21C). The states are briefly explained as follows.

State A (available): A new access is acceptable without a pending state.

State B (busy): The state at the time of an access to a shared storage until the end of the access.

State EP (exception pending): The exception (an interrupt has arisen) pending state after an access to a shared storage is completed abnormally.

State RP (retry pending): The retry pending state of an access to a shared storage in which the access has just failed.

Next, the transition of each state is explained by referring to the numbers ①-⑦.

① The state is changed by initialization of PM (processing module). That is, an RST (reset signal) of flip flops 801 and 802, shown in FIG. 21C are set to 0, and the outputs Q and Q of the flip flops 801 and 802 are set to 0 and 1 respectively. Then, the states A, B, EP, and RP which are outputs of AND circuits 812, 813, 814, and 815, shown in FIG. 21C, are (A, B, EP, RP)=(1, 0, 0, 0). This refers to state A.

② The state is changed by starting accepting a write to a shared storage. That is, when a write accept signal (WT ACPT) indicates 1 if A=1, the output ② of an AND circuit 806 indicates 1, a set input S of the flip flop 802 indicates 1 through an OR circuit 810 of FIG. 21C, and the outputs of AND circuits 803, 807, and 808 of FIG. 21C are all 0 if B=0 and RT=0, the output of an OR circuit 811 is 0. Therefore, S equals 1 and R equals 0. Thus, the flip flop 802 is changed from a reset to a set with the values S and R set to 1 and 0 respectively. That is, the output Q equals 1 and $\overline{Q}$ equals 0. Since the flip-flop 801 is still in the reset state, $\overline{Q}$ equals 1. Thus, the output of the AND circuit 813 indicates 1 from 0, that is, B equals 1. Accordingly, $\overline{Q}$ of the flip flop 802 equals 0 and A turns to 0 from 1. Since the output Q of the flip flop 801 equals 0, the outputs EP and RP of the AND circuits 814 and 815 are still 0. Therefore, (A, B, EP, RP, refers to (0, 1, 0, 0). This indicates state B.

③ When a write to a shared storage is completed successfully, the state is changed. That is, since A equals 0 and EP equals 0 the outputs of the AND circuits 806 and 807, of FIG. 21C, and the output of the OR circuit 810 indicate 1. And since the output of the AND circuit 808 indicates 1, and the output of the OR circuit 811 indicates 1. Then, the state of the flip flop 802 indicates the reset state. Therefore, the flip flops 801 and 802 are in the reset state, and (A, B, EP, RP) equal (1, 0, 0, 0).

④ The state is changed when an exception is detected in an access to a shared storage. That is, when an access exception signal (ACEXC) is received, the output of the AND circuit 803 indicates 1 because B=1. Since RP indicates 0 at this time, the outputs of AND circuits 804 and 805 and the OR circuit 806 are 0. Therefore, a set terminal S and a reset terminal R of the flip flop 801 are 1 and 0 respectively, thereby indicating a set state. Since the flip flop 801 is in the set state, that is, $\overline{Q}$=0, and the flip flop 802 is in the reset state, that is, $\overline{Q}$=0, $\overline{Q}$=1, (A, B, EP, RP) equal (0, 0, 1, 0). This indicates state EP.

⑤ When new access instruction for accessing to a shared storage or a serialize instruction is executed in state EP, a synchronous interrupt is generated in the CPU, and the state is changed to RP, that is, the retry pending state. That is, when EP=1, the output of the AND circuit 807 indicates 1 if a new access signal (NEW ACCS) indicates 1. At this time the outputs of the OR circuits 810 and 811 indicate 1 and 0 respectively. To make the OR circuit 811 indicate 0, B and RP must be 0. Accordingly, the outputs of the AND circuits 803 and 808 are 0, and, the output of the AND circuit 805 is 0. Therefore, the flip flop 802 gets into the set state. That is, the flip flops 801 and 802 also get into the set state. At this time (A, B, EP, RP) equal (0, 0, 0, 1). In FIG. 21A, an exception detection signal is applied to the state controller 80 as indicated by ④, and a synchronous interrupt request is outputted as indicated by ⑤.

⑥ When new access instruction for accessing a shared storage or a serialize instruction is executed in state RP, a new access must stand by and the circuit put in state B to execute a suspended retrial. That is, if a new access signal indicates 1 with RP set to 1, the output of the AND circuit 806 turns to 1, and A, B, and RP indicate 0, 0, 1 respectively. Therefore, the AND circuit 803 indicates 0, thereby putting the flip flop 801 in the reset state. Since the AND circuits 803, 805,and 808 all indicate 0, the flip flop 802 is not reset, but remains in the set state. That is, since the flip flop 801 indicates the reset state and the flip flop 802 indicates the set state, (A, B, EP, RP) equal (0, 1, 0, 0).

⑦ When a cancel instruction for canceling a suspended retrial is received, the retry is canceled and the system is restored in state A. That is, when a cancel accept signal (CAN ACPT) indicates 1, the output of the AND circuit 805 indicates 1, and the outputs of the OR circuits 809 and 811 indicate 0, thereby putting the flip flops 801 and 802 in the reset state, and (A, B, EP, RP) equal (1, 0, 0, 0).

Figure 22A:
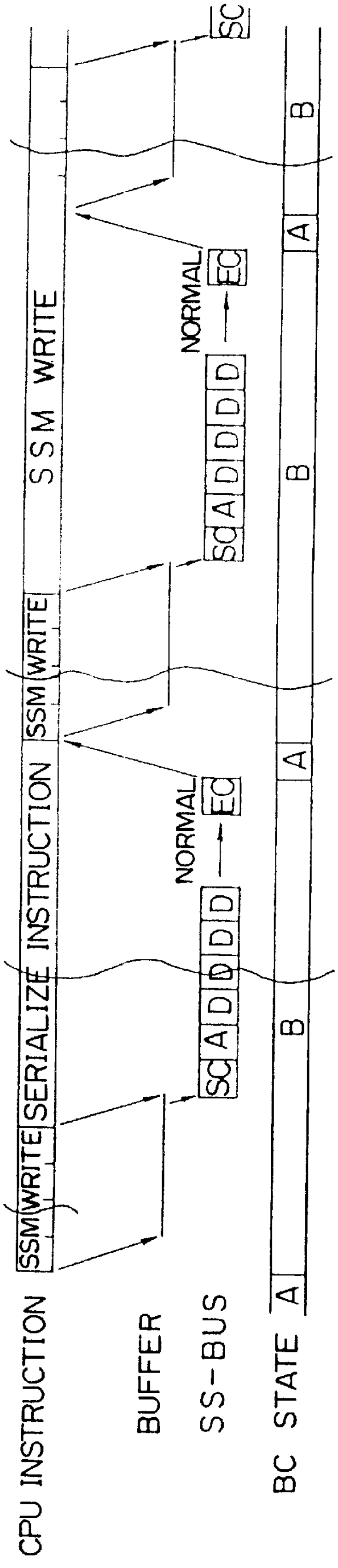
FIGS. 22A and 22B are the timing charts for explaining the operation of the present invention.
Figure 22B:
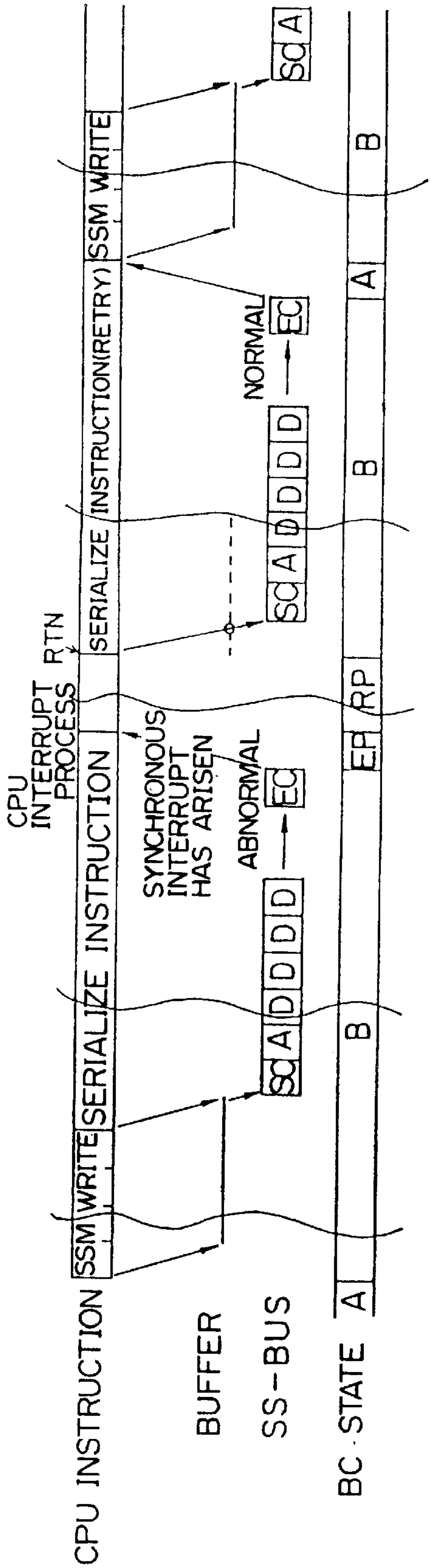

FIGS. 22A and 22B are timing charts for explaining the write control of the present invention. In FIG. 22A, a write request is rejected in the present invention when an SSM write instruction is issued by the CPU. Accordingly, a command (SC), an address (A), and data to be stored (D) are outputted to the SS-BUS through a buffer asynchronously with the CPU instruction. At this time the state transition circuit for controlling the write state changes from state A to state B. The CPU issues a write instruction has followed by a serialize instruction. When a write operation is successfully performed, an end command (EC) indicating the normal operation is returned to the CPU, and the state transition circuit changes from state B to state A. If data are written to an SSM again, the same operation is performed. The CPU can execute the write instruction followed by other instructions.

However, as shown in FIG. 22B, when an exception is detected in an access to a shared storage, state B is changed to state EP, a synchronous interrupt indicating an abnormal operation is issued to the CPU, and the state transition circuit changes from state EP to state RP. In state RP, the CPU executes from the interrupt routine. The state transition circuit executes in this state (retries) a serialize instruction to another access the shared storage. Then, the same command (SC), address (A), and data (D) as those of the previous trial already stored in the SS-BUS buffer are transmitted to the side of the shared storage. At this time, the new access stands by, and the state transition circuit changes from state RP to state B to execute the suspended retrial. If the retrial is successfully, executed, an end code EC indicating a normal termination is returned, and the state transition circuit is set in state A. The next write process is performed using the same procedure.

FIG. 22C shows the process performed by the interrupt handler. An instruction string ① R, R indicates a writing operation from a register to another register; ② R, SSM indicates a data transmission from the register to an SSM; ③ R, LSU indicates a data transmission from register to an LSU; ④ LSU, LSU indicates a data transmission from an LSU to another LSU; and ⑤ R, SSR indicates a serialize instruction.

First, a write to the SSM is accepted by the instruction of ② above.

If an exception arises during a write to an SSM, the operation state changes to state EP. If a writing operation fails when a serialize instruction (or new access instruction for accessing an SSM) of ⑤ above is being issued, and if an exception detection signal is applied to the state controller 80, a synchronous interrupt is generated to the CPU with state EP changed to state RP. Then, the interrupt handler determines the possibility of a retry. If a retrial can be accepted, control can be returned to an original program to perform the retrial. If the retrial cannot be accepted, a retrial cancel instruction is issued, the operation state is returned to state A, and control is returned to the original program. If the operation state indicates state RP after re-executing the instruction shown in (5) above, suspended instructions are retried and the instruction shown in (5) above is executed. If the operation state indicates state A, the instruction shown in (5) above must be executed immediately.

As described above, in the present invention, data are transmitted in a block access method in which a plurality of words are grouped in one block if access addresses are serialized. Thus, a system bus can access data at a high speed and an overhead can be reduced. As a result, the system bus load can be reduced, and the system performance can be improved through the highly efficient system bus. When the operation is performed at a high speed using the block data transmission in which a write may be rejected, a write instruction is followed by a serialize instruction, the write operation is checked as to whether or not it is performed successfully, a synchronous interrupt is generated for the CPU if an abnormal write arises, and then the write is retried. Thus, a recovery process can be performed in the event of an abnormal write in the block transmission, thereby enhancing the system reliability.

What is claimed is:

1. An asynchronous access system to a storage, said asynchronous access system comprising:

a central processing unit outputting data;

a storage re-writable by said central processing unit; and write control means, provided between said central processing unit and said storage, for controlling writing of the data from the central processing unit to said storage, said write control means comprising:

a buffer storing the data, means for executing a write instruction of the data to the buffer asynchronously with the writing of the data to the storage, means for sending the data stored in the buffer in a manner that if addresses of the write instructions are consecutive to each other, a plurality of pieces of the data corresponding to consecutive addresses of the write instructions are stored in the buffer, and, then, the plurality of pieces of the data stored in the buffer are sent out from the buffer at one time for a plurality of the write instructions whose addresses are consecutive;

means for adding to an end of said write instruction a serialize instruction indicating the end of the write instruction and for initiating immediate writing of the data preceding the serialize instruction to the storage by the write control means synchronously with writing of the data to the buffer based on the serialize instruction, and means for generating an exception interrupt request synchronously with said serialize instruction when an exception has arisen during the writing of the data to the storage and the writing of the data to the storage is synchronous with execution of said write instruction, interruption of the central processing unit being prevented while the serialize instruction is output, wherein execution of the serialize instruction ensures completion of the writing to the storage of the data preceding the serialize instruction.

2. An asynchronous access system according to claim 1, further comprising a plurality of central processing units, wherein said storage is shared and accessed by each of said plurality of central processing units.

3. An asynchronous access system according to claim 1, wherein said write control means is in one of state A, state B, state EP, and state RP, the state A accepting a new write access, the state B indicating in which state the write control means is in from a start of a write access of the storage to an end of said write access, the state EP in which a write access to said storage terminates abnormally and an exception is suspended, and the state RP in which a retry of the write access that has failed to a storage is suspended, and wherein state B is changed to state EP when the exception is detected in the write access to the storage, and an interrupt by the central processing unit is generated simultaneously with a change in the write control means from the state RP when one of the new write access to said shared storage and the serialize write instruction is executed in the state EP.

4. An asynchronous access system according to claim 3, wherein said write control means is changed to state A by initialization of said central processing unit, to the state B by reception of a write to the storage, and to the state A when the write to the storage is completed normally, when one of the new write access for accessing the storage and the serialize write instruction is executed and the write control means is in the state RP, the interrupt is generated by the central processing unit, and the state is changed to the state RP, when one of the new write access for accessing the storage and the serialize write instruction is executed and the write control means is in state RP, the new write access stands by and the write control means is changed to the state B to execute a suspended retry, and when a cancel instruction for cancelling a suspended retry is received, said retry is canceled and the write control means is changed to the state A.

5. An asynchronous access system to a storage according to claim 4, wherein said storage is a shared storage.

* * * * *